US011179908B2

(12) United States Patent
Enomoto et al.

(10) Patent No.: US 11,179,908 B2
(45) Date of Patent: Nov. 23, 2021

(54) METHOD OF MANUFACTURING GLOVES, GLOVE, AND EMULSION COMPOSITION FOR GLOVES

(71) Applicant: Midori Anzen Co., Ltd., Tokyo (JP)

(72) Inventors: Norihide Enomoto, Tokyo (JP); Taichi Ogawa, Tokyo (JP); Kenichi Yanagisawa, Chiba (JP); Nobuyuki Matsumoto, Chiba (JP)

(73) Assignee: Midori Anzen Co., Ltd., Tokyo (JP)

( * ) Notice: Subject to any disclaimer, the term of this patent is extended or adjusted under 35 U.S.C. 154(b) by 156 days.

(21) Appl. No.: 16/308,527

(22) PCT Filed: Jun. 16, 2017

(86) PCT No.: PCT/JP2017/022367
§ 371 (c)(1),
(2) Date: Dec. 10, 2018

(87) PCT Pub. No.: WO2017/217542
PCT Pub. Date: Dec. 21, 2017

(65) Prior Publication Data
US 2019/0174848 A1    Jun. 13, 2019

(30) Foreign Application Priority Data
Jun. 16, 2016  (JP) ................................ 2016-119754

(51) Int. Cl.
*B29D 99/00* (2010.01)
*A41D 19/04* (2006.01)
(Continued)

(52) U.S. Cl.
CPC ..... *B29D 99/0067* (2013.01); *A41D 19/0055* (2013.01); *A41D 19/04* (2013.01);
(Continued)

(58) Field of Classification Search
CPC ............................ B29C 41/14; B29D 99/0067
See application file for complete search history.

(56) References Cited

U.S. PATENT DOCUMENTS 2,941,956 A     6/1960  Bergstrom
10,954,364 B2 * 3/2021  Enomoto .............. B29C 41/003
(Continued)

FOREIGN PATENT DOCUMENTS

JP         47-33279 B2      8/1972
JP       2013203914 A      10/2013
(Continued)

OTHER PUBLICATIONS

Kennemur, Justin G., and Bruce M. Novak. "Advances in polycarbodiimide chemistry." Polymer 52.8 (Mar. 3, 2011): 1693-1710. (Year: 2011).*
(Continued)

*Primary Examiner* — Benjamin A Schiffman
(74) *Attorney, Agent, or Firm* — Marshall, Gerstein & Borun LLP

(57) ABSTRACT

Provided is a method of producing a glove, the method including: (1) the step of immersing a glove forming mold in a liquid coagulant containing calcium ions so as to allow the coagulant to adhere to the glove forming mold; (2) the step of adjusting the pH to be 9 or higher using an ammonium compound or an amine compound and leaving a glove emulsion composition to stand with stirring; (3) the dipping step of immersing the glove forming mold, to which the coagulant has thus adhered in the step (1), in the glove emulsion composition; (4) the gelling step of leaving the glove forming mold, to which the glove emulsion composition has thus adhered, to stand at a temperature for a period that satisfy specific conditions; (5) the leaching step of removing impurities from a cured film precursor thus formed on the glove forming mold; (6) the beading step of,
(Continued)

after the leaching step, winding the cuff portion of the resulting glove; (7) the precuring step of heating and drying the cured film precursor that has been subjected to the beading step; and (8) the curing step of heating the cured film precursor at a specific temperature for a specific period to obtain a cured film.

8 Claims, 1 Drawing Sheet

(51) Int. Cl.
| | |
|---|---|
| B29C 41/14 | (2006.01) |
| C08J 3/26 | (2006.01) |
| C08K 5/29 | (2006.01) |
| C08L 13/02 | (2006.01) |
| C08L 9/06 | (2006.01) |
| A41D 19/00 | (2006.01) |
| C08J 3/03 | (2006.01) |

(52) U.S. Cl.
CPC ............... *B29C 41/14* (2013.01); *C08J 3/03* (2013.01); *C08J 3/26* (2013.01); *C08K 5/29* (2013.01); *C08L 9/06* (2013.01); *C08L 13/02* (2013.01); *C08J 2313/02* (2013.01); *C08J 2409/02* (2013.01)

(56) References Cited

U.S. PATENT DOCUMENTS

| | | | |
|---|---|---|---|
| 2006/0070167 A1* | 4/2006 | Eng | ............... A61K 8/345 2/168 |
| 2009/0105424 A1* | 4/2009 | Kodama | ............... B29C 41/14 525/331.9 |
| 2013/0191964 A1 | 8/2013 | Khoo et al. | |
| 2013/0198933 A1 | 8/2013 | Khoo et al. | |
| 2015/0218352 A1* | 8/2015 | Enomoto | ............. C08K 5/0025 2/168 |
| 2017/0015819 A1 | 1/2017 | Enomoto et al. | |
| 2021/0179820 A1* | 6/2021 | Enomoto | ........... A41D 19/0055 |
| 2021/0221966 A1* | 7/2021 | Enomoto | ................... C08J 5/18 |

FOREIGN PATENT DOCUMENTS

| | | |
|---|---|---|
| JP | 2015/513486 A | 5/2015 |
| JP | 2015187227 A | 10/2015 |
| KR | 101687866 B1 | 12/2016 |
| RU | 2013119849 A | 11/2014 |
| RU | 2013119850 A | 11/2014 |
| RU | 2637243 C2 | 12/2017 |
| RU | 2646552 C2 | 3/2018 |
| WO | WO-2004/081056 A2 | 9/2004 |
| WO | WO-2013/129905 A1 | 9/2013 |
| WO | WO-2015/129871 A1 | 9/2015 |
| WO | WO-2016/013666 A1 | 1/2016 |
| WO | WO-2017/006385 A1 | 1/2017 |

OTHER PUBLICATIONS

Search Report in International Application No. PCT/JP2017/022367 dated Sep. 5, 2017, 2 pages.
International Preliminary Report on Patentability and Written Opinion in International Application No. PCT/JP2017/022367 dated Dec. 27, 2018, 6 pages.
Office Action in CA Application No. 3,027,262 dated Aug. 12, 2020, 5 pages.
Office Action in CA Application No. 3027262 dated Nov. 15, 2019, 5 pages.
Office Action in RU Application No. 2018144316 dated Jun. 26, 2019, 10 pages.
Search Report in EP Application No. 17813435.9 dated Oct. 25, 2019, 6 pages.
Database WPI Week 201548, Thomson Scientific, London, GB; AN 2015-323835, XP002794888 relating to KR 2015 0057092 A, May 28, 2015, 3 pages.

* cited by examiner

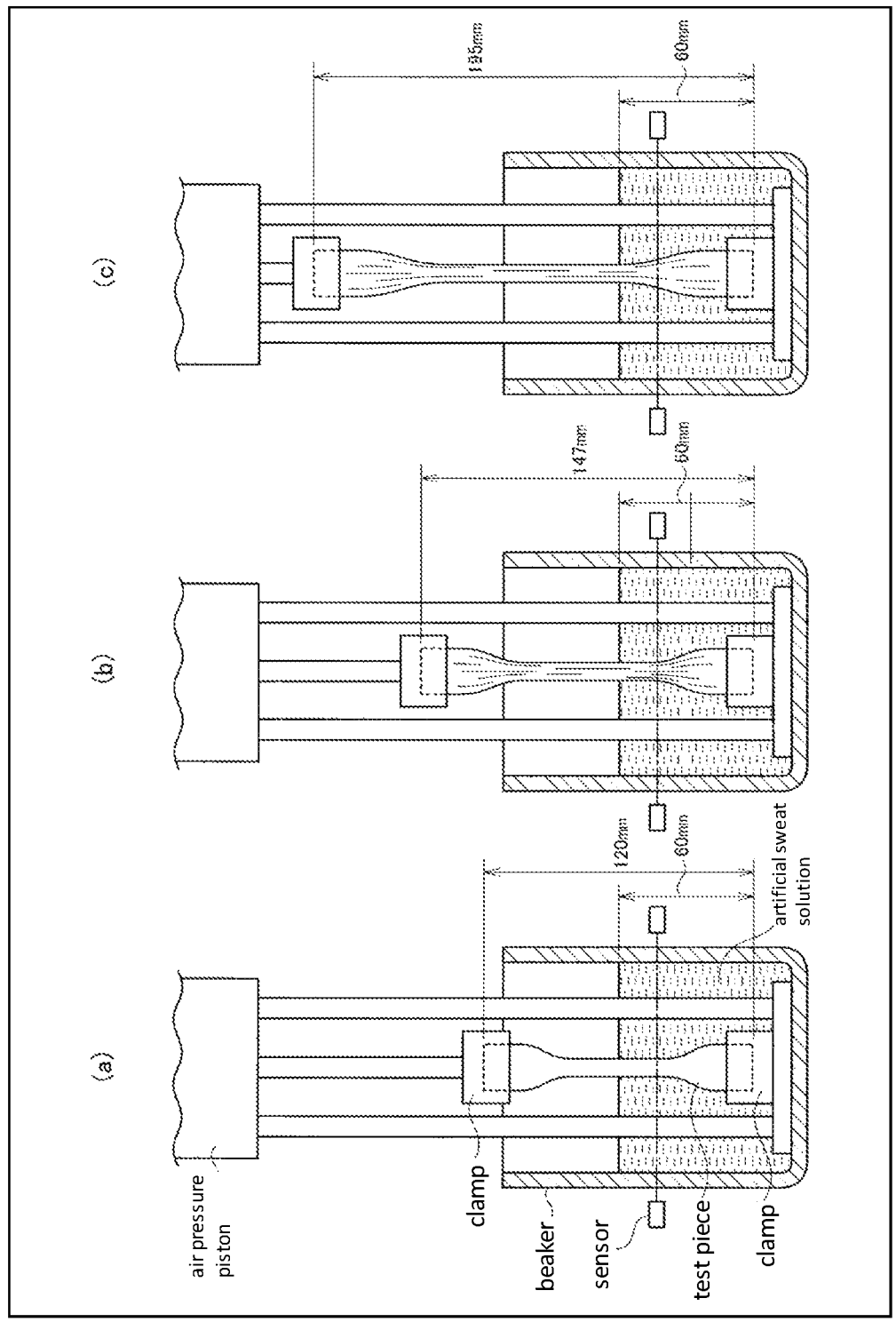

METHOD OF MANUFACTURING GLOVES, GLOVE, AND EMULSION COMPOSITION FOR GLOVES

CROSS-REFERENCE TO RELATED APPLICATIONS

This application is the U.S. national stage of International Application No. PCT/JP2017/022367 filed Jun. 16, 2017 entitled "Method of Manufacturing Gloves, Glove, and Emulsion Composition for Gloves," which claims the priority of Japanese patent application No. 2016-119754 filed Jun. 16, 2016, the entire respective disclosures of which are incorporated herein by reference.

TECHNICAL FIELD

Embodiments of the present invention relate to: a method of producing a glove; a glove; and a glove emulsion composition.

BACKGROUND ART

Conventionally, gloves that are produced by dip-molding a latex composition crosslinked with sulfur and a sulfur-based vulcanization accelerator of a thiazole type have been widely used in a variety of industrial fields, medical fields and the like. However, since sulfur and sulfur-based vulcanization accelerators can cause type IV allergy, there have been proposed self-crosslinking gloves that do not contain such materials as well as gloves that are produced using various organic crosslinking agents. For example, as mentioned below, gloves in which a polycarbodiimide is used as a crosslinking agent (polycarbodiimide-crosslinked gloves) have been proposed.

As the prior art of a polycarbodiimide-crosslinked glove, for example, the following four technologies have been disclosed; however, it is believed that none of them has been completed in terms of practical application of a polycarbodiimide-crosslinked glove.

Patent Document 1 discloses a glove that is obtained by curing a polymer solution prepared by mixing a carbodiimide group-containing compound and a carboxylate-containing compound (filed on Feb. 29, 2012).

Patent Document 2 discloses a glove that is obtained by forming crosslinked structures of a carboxyl group-containing conjugated diene rubber using a polymer that contains a monomer unit having an oxazoline group or a monomer unit having a carbodiimide structure (filed on Mar. 29, 2012).

Patent Document 3 discloses a rubber glove that is obtained by curing, by dip-molding, a carboxylic acid-modified nitrile-based copolymer latex composition containing a reactive carbodiimide compound (filed on Nov. 18, 2013).

Patent Document 4 discloses a glove that is obtained by forming crosslinked structures of a carboxyl group-containing conjugated diene rubber using a polymer that contains a monomer unit having a carbodiimide group (filed on Mar. 27, 2014).

RELATED ART DOCUMENTS

Patent Documents

[Patent Document 1] Japanese Unexamined Patent Application Publication (Translation of PCT Application) No. 2015-513486

[Patent Document 2] Japanese Unexamined Patent Application Publication No. 2013-203914

[Patent Document 3] Korean Patent No. 10-1687866

[Patent Document 4] Japanese Unexamined Patent Application Publication No. 2015-187227

SUMMARY OF THE INVENTION

Problems to be Solved by the Invention

As described below in detail, the present invention examined practical application of a glove crosslinked with a polycarbodiimide that is an organic crosslinking agent, focusing on the high fatigue durability of polycarbodiimides.

The above-described prior arts all relate to a glove in which a polycarbodiimide is used as a crosslinking agent as in the present invention.

However, these prior art documents offer no disclosure or provide only insufficient disclosure with regard to the requirements of an XNBR and a polycarbodiimide that are used for imparting high fatigue durability and tensile strength necessary for gloves to a glove in which a polycarbodiimide is used as a crosslinking agent.

Moreover, with regard to the production method thereof, the process conditions of gelling and the like performed for crosslinking carbodiimide are either not disclosed at all or only insufficiently disclosed.

Polycarbodiimide-crosslinked gloves have overwhelmingly higher fatigue durability than conventional gloves.

On the other hand, it is very difficult to allow polycarbodiimide-crosslinked gloves to have tensile characteristics required for gloves.

Further, because of the properties of polycarbodiimides, it is necessary to fully revise a conventional production method and to re-examine the materials to be used.

In view of the above, an object of the present invention is to provide: a method of producing a glove using a carbodiimide group-containing crosslinking agent as an organic crosslinking agent, which glove not only exhibits high fatigue durability but also has sufficient tensile strength as a glove obtained with the use of a carbodiimide group-containing crosslinking agent; a glove; and a glove emulsion composition used for the method of producing a glove.

Means for Solving the Problems

One embodiment of the present invention relates to the following method of producing a glove.

A method of producing a glove, the method including:

(1) the step of immersing a glove forming mold in a liquid coagulant containing calcium ions so as to allow the coagulant to adhere to the glove forming mold;

(2) the step of adjusting the pH to be 9 or higher using an ammonium compound or an amine compound and leaving a glove emulsion composition, which has the below-described formulation, to stand with stirring;

(3) the dipping step of immersing the glove forming mold, to which the coagulant has thus adhered in the step (1), in the glove emulsion composition;

(4) the gelling step of leaving the glove forming mold, to which the glove emulsion composition has thus adhered, to stand at a temperature for sa period that satisfy the following conditions:

conditions: a temperature and a period that allow the calcium ions contained in the coagulant to infiltrate into an elastomer contained in the glove emulsion composition and to thereby induce gelation, without causing ammonium salts of the elastomer contained in the glove emulsion composition to be converted back to carboxyl groups and without causing a hydrophilic segment of a polycarbodiimide to be opened;

(5) the leaching step of removing impurities from a cured film precursor thus formed on the glove forming mold;

(6) the beading step of, after the leaching step, winding the cuff portion of the resulting glove;

(7) the precuring step of heating and drying the cured film precursor that has been subjected to the beading step; and (8) the curing step of heating the cured film precursor to obtain a cured film, the heating being performed at a temperature for a period that are sufficient for the ammonium salts of the elastomer to be converted back to carboxyl groups, the carbodiimide groups of the polycarbodiimide to be exposed, and the carboxyl groups of the elastomer to react with the carbodiimide groups, which steps (3) to (8) are performed in the order mentioned, wherein the glove emulsion composition includes, at least: an elastomer that contains an acrylonitrile or methacrylonitrile-derived structural unit, an unsaturated carboxylic acid-derived structural unit and a butadiene-derived structural unit in a polymer main chain; a polycarbodiimide; water; and at least one pH modifier selected from an ammonium compound and an amine compound, the elastomer has a Mooney viscosity ($ML_{(1+4)}$ (100° C.)) of 80 or higher, the elastomer contains the acrylonitrile or methacrylonitrile-derived structural unit in an amount of 20 to 40% by weight, the unsaturated carboxylic acid-derived structural unit in an amount of 1 to 10% by weight, and the butadiene-derived structural unit in an amount of 50 to 75% by weight, and the polycarbodiimide includes at least one polycarbodiimide containing a hydrophilic segment in its molecular structure.

Another embodiment of the present invention relates to: a glove composed of a cured film of an elastomer that contains an acrylonitrile or methacrylonitrile-derived structural unit, an unsaturated carboxylic acid-derived structural unit and a butadiene-derived structural unit in a polymer main chain and has a Mooney viscosity ($ML_{(1+4)}$ (100° C.)) of 80 or higher, wherein the cured film contains crosslinked structures formed by a polycarbodiimide and calcium ions.

Yet another embodiment of the present invention relates to: a glove composed of a cured film of an elastomer that contains an acrylonitrile or methacrylonitrile-derived structural unit, an unsaturated carboxylic acid-derived structural unit and a butadiene-derived structural unit in a polymer main chain, wherein the cured film has a fatigue durability, which is determined by the below-described test method, of 400 minutes or longer and a tensile strength of 20 MPa or higher, the cured film contains crosslinked structures formed by a polycarbodiimide and calcium ions, and the elastomer contains the acrylonitrile or methacrylonitrile-derived structural unit in an amount of 20 to 40% by weight, the unsaturated carboxylic acid-derived structural unit in an amount of 1 to 10% by weight, and the butadiene-derived structural unit in an amount of 50 to 75% by weight:

fatigue durability test method: after preparing a #1 dumbbell test piece of 120 mm in length and 0.07 mm in thickness according to JIS K6251 from the cured film, the thus obtained test piece is repeatedly stretched in the lengthwise direction between a maximum length of 195 mm and a minimum length of 147 mm over a period of 12.5 seconds by pulling the upper part of the test piece with the lower part of the test piece being immobilized and immersed in an artificial sweat solution up to a length of 60 mm, and the time until the test piece is torn is measured.

Yet another embodiment of the present invention relates to: a glove emulsion composition including, at least: an elastomer that contains an acrylonitrile or methacrylonitrile-derived structural unit, an unsaturated carboxylic acid-derived structural unit and a butadiene-derived structural unit in a polymer main chain; a polycarbodiimide; water; and a pH modifier selected from an ammonium compound and an amine compound, wherein the elastomer has a Mooney viscosity ($ML_{(1+4)}$ (100° C.)) of 80 or higher, the elastomer contains the acrylonitrile or methacrylonitrile-derived structural unit in an amount of 20 to 40% by weight, the unsaturated carboxylic acid-derived structural unit in an amount of 1 to 10% by weight, and the butadiene-derived structural unit in an amount of 50 to 75% by weight, the polycarbodiimide includes at least one polycarbodiimide containing a hydrophilic segment in its molecular structure, and the polycarbodiimide has a polymerization degree of 2 or higher and a carbodiimide equivalent of 260 to 500.

Effects of the Invention

By using a glove emulsion composition that contains an elastomer having a specific Mooney viscosity, a specific polycarbodiimide, water, a specific pH modifier and the like and performing specific steps, an excellent glove having not only unprecedented fatigue durability but also tensile characteristics required for gloves can be produced.

BRIEF DESCRIPTION OF THE DRAWING

FIG. 1 shows cross-sectional views that schematically illustrate one example of a fatigue durability test apparatus.

MODE FOR CARRYING OUT THE INVENTION

Preferred embodiments of the present invention will now be described; however, needless to say, the present invention is not restricted thereto, and various revisions and modifications may be made to the embodiments. It is noted here that "weight" and "mass" have the same meaning and are thus hereinafter collectively stated as "weight".

The term "fatigue durability" used herein means the resistance of a glove against deterioration in performance and breakage that are caused by the sweat of a user (worker). A concrete evaluation method thereof is described below.

1. Glove Emulsion Composition

The glove emulsion composition according to the present embodiment includes, at least: an elastomer material (hereinafter, also referred to as "elastomer") that contains an acrylonitrile or methacrylonitrile (hereinafter, also collectively referred to as "(meth)acrylonitrile")-derived structural unit, an unsaturated carboxylic acid-derived structural unit and a butadiene-derived structural unit in a polymer main chain; a polycarbodiimide; a pH modifier selected from an ammonium compound and an amine compound; and water. This glove emulsion composition can be particularly preferably used as a dipping liquid for gloves.

<Elastomer>

The elastomer contains, at least, a (meth)acrylonitrile-derived structural unit, an unsaturated carboxylic acid-derived structural unit and a butadiene-derived structural unit. This elastomer may also be hereinafter referred to as "carboxylated (meth)acrylonitrile-butadiene elastomer" or "XNBR".

With regard to the ratios of these structural units, for the production of a glove, the elastomer contains: the (meth)acrylonitrile-derived structural unit, namely a (meth)acrylonitrile residue, in a range of 20 to 40% by weight; the unsaturated carboxylic acid-derived structural unit, namely an unsaturated carboxylic acid residue, in a range of 1 to 10% by weight; and the butadiene-derived structural unit, namely a butadiene residue, in a range of 50 to 75% by weight.

The ratios of these structural units can be simply determined from the weight ratios of the respective raw materials used for the production of the elastomer.

The (meth)acrylonitrile-derived structural unit is an element that mainly imparts strength to a rubber glove, and an excessively small amount thereof leads to insufficient strength, whereas an excessively large amount thereof improves the chemical resistance but makes the rubber glove overly hard. The ratio of the (meth)acrylonitrile-derived structural unit in the elastomer is more preferably 25 to 30% by weight. The amount of the (meth)acrylonitrile-derived structural unit can be determined by converting the amount of nitrogen atoms, which is determined by elemental analysis, into the amount of nitrile groups.

The butadiene-derived structural unit is an element that imparts flexibility to a rubber glove and, usually, the flexibility is lost when the ratio of this structural unit is lower than 50% by weight. The ratio of the butadiene-derived structural unit in the elastomer is more preferably 58 to 62% by weight, particularly preferably about 60% by weight.

In order to maintain the physical properties of a rubber glove as a final product having an appropriate crosslinked structures, the amount of the unsaturated carboxylic acid-derived structural unit is preferably 1 to 10% by weight, more preferably 1 to 9% by weight, still more preferably 2 to 8% by weight. The amount of the unsaturated carboxylic acid-derived structural unit can be determined by quantifying carboxyl groups and carbonyl groups derived from carboxyl groups by infrared (IR) spectroscopy or the like.

The unsaturated carboxylic acid forming the unsaturated carboxylic acid-derived structural unit is not particularly restricted, and may be a monocarboxylic acid or a polycarboxylic acid. More specific examples of the unsaturated carboxylic acid include acrylic acid, methacrylic acid, crotonic acid, maleic acid, and fumaric acid. Thereamong, acrylic acid and/or methacrylic acid (hereinafter, collectively referred to as "(meth)acrylic acid") is preferably used, and methacrylic acid is more preferably used.

The butadiene-derived structural unit is preferably a structural unit derived from 1,3-butadiene.

It is preferred that the polymer main chain be substantially constituted by the (meth)acrylonitrile-derived structural unit, the unsaturated carboxylic acid-derived structural unit and the butadiene-derived structural unit; however, the polymer main chain may also contain a structural unit derived from other polymerizable monomer.

The structural unit derived from other polymerizable monomer is contained in the elastomer in an amount of preferably not greater than 30% by weight, more preferably not greater than 20% by weight, still more preferably not greater than 15% by weight.

Examples of polymerizable monomers that can be preferably used include aromatic vinyl monomers, such as styrene, α-methylstyrene and dimethyl styrene; ethylenically unsaturated carboxylic acid amides, such as (meth)acrylamide and N,N-dimethylacrylamide; ethylenically unsaturated carboxylic acid alkyl ester monomers, such as methyl (meth)acrylate, ethyl (meth)acrylate, butyl (meth)acrylate and 2-ethylhexyl (meth)acrylate; and vinyl acetate. These monomers may be used singly, or in combination of two or more thereof as desired.

The elastomer can be prepared by emulsion-polymerizing, in accordance with a conventional method, an unsaturated carboxylic acid (e.g., (meth)acrylonitrile or (meth)acrylic acid), a butadiene (e.g., 1,3-butadiene) and, as required, other polymerizable monomer(s), using an emulsifying agent, a polymerization initiator, a molecular weight modifier and the like that are normally used. In this emulsion polymerization, water is incorporated in such an amount that attains a solid content of preferably 30 to 60% by weight, more preferably 35 to 55% by weight.

After the synthesis of the elastomer, the resulting emulsion polymerization solution can be directly used as an elastomer component of the glove emulsion composition.

Examples of the emulsifying agent include anionic surfactants, such as dodecylbenzenesulfonates and aliphatic sulfonates; cationic sulfonates, such as polyethylene glycol alkyl ethers and polyethylene glycol alkyl esters; and amphoteric surfactants, and an anionic surfactant is preferably used.

The polymerization initiator is not particularly restricted as long as it is a radical initiator, and examples thereof include inorganic peroxides, such as ammonium persulfate and potassium superphosphate; organic peroxides, such as t-butyl peroxide, cumene hydroperoxide, p-menthane hydroperoxide, di-t-butyl peroxide, t-butylcumyl peroxide, dibenzoyl peroxide, 3,5,5-trimethylhexanoyl peroxide, and t-butyl peroxyisobutyrate; and azo compounds, such as azobisisobutyronitrile, azobis-2,4-dimethyl valeronitrile, azobiscyclohexane carbonitrile, and methyl azobisisobutyrate.

Examples of the molecular weight modifier include mercaptans, such as t-dodecylmercaptan and n-dodecylmercaptan; and halogenated hydrocarbons, such as carbon tetrachloride, methylene chloride and methylene bromide, among which mercaptans such as t-dodecylmercaptan and n-dodecylmercaptan are preferred.

Along with the ratio of the acrylonitrile-derived structural unit and that of the butadiene-derived structural unit, the Mooney viscosity ($ML_{(1+4)}$ (100° C.)) of the elastomer is a factor that greatly affects the tensile strength of a glove. The present inventors discovered by experiments that, in the polycarbodiimide-crosslinked glove according to the embodiments of the present invention, ionic crosslinks formed by calcium ions of a coagulant are substantially responsible for the tensile strength. Further, as a result of experiments conducted on various elastomers, it was found that the tensile strength of gloves is in a proportional relationship with the Mooney viscosity of elastomers.

In order to attain a tensile strength of 20 MPa or higher that is required for gloves, it is necessary that the Mooney viscosity of the elastomer be 80 or higher. This was discovered from the results of the below-described Experimental Examples shown in Table 1.

As for the upper limit of the Mooney viscosity of the elastomer, the measurement limit of the Mooney viscosity itself is 220, and an excessively high Mooney viscosity causes a problem in moldability. Further, at a Mooney viscosity of higher than 160, a phenomenon of reduction in fatigue durability controlled by polycarbodiimide groups was observed. Therefore, the Mooney viscosity of the elastomer is preferably not higher than 160.

With regard to the problems on the Mooney viscosity and the tensile strength, in common XNBR gloves formed by sulfur crosslinking and zinc crosslinking, the Mooney viscosity of the elastomer does not have to be taken into consideration since the tensile strength can be controlled by increasing the amount of zinc; however, in polycarbodiimide-crosslinked gloves, the Mooney viscosity of the elastomer is a condition required for increasing the tensile strength.

The Mooney viscosity ($ML_{(1+4)}$ (100° C.)) and the molecular weight of the elastomer correlate with each other and, in polycarbodiimide-crosslinked gloves, it is believed, also from Table 1 showing the measured Mooney viscosity values, that the range of the molecular weight is an important factor for attaining tensile strength and fatigue durability.

Meanwhile, in order to allow a polycarbodiimide, which has a higher molecular weight than zinc and sulfur, to be easily incorporated into the elastomer chain, it is desired that the elastomer chain have only a small amount of branches and be linear.

The number of branches of an XNBR is known to be increased by a high polymerization temperature; therefore, a cold rubber having a low polymerization temperature (polymerization temperature: 5 to 25° C.) is more preferred than a hot rubber (polymerization temperature: 25 to 50° C.).

This can also be seen from the results of Experimental Example 1 shown in Table 1, where the XNBR had a high Mooney viscosity of 111, the MEK-insoluble content was low at 10% by weight or less, and the elastomer having a small number of branches exhibited a high tensile strength of 38 MPa.

In the elastomer, the content of elemental sulfur detected by neutralization titration of a combustion gas is preferably 1% by weight or less of the elastomer weight.

The elemental sulfur can be quantified by a method of allowing a hydrogen peroxide solution, to which a mixed indicator is added, to absorb a combustion gas generated by combustion of 0.01 g of an XNBR sample in the air at 1,350° C. for 10 to 12 minutes and subsequently performing neutralization titration of the hydrogen peroxide solution with a 0.01 N aqueous NaOH solution.

In the glove emulsion composition, plural kinds of elastomers may be used in combination.

The content ratio of the elastomer(s) in the glove emulsion composition is not particularly restricted; however, it is preferably 15 to 35% by weight or so, more preferably 18 to 30% by weight.

<Polycarbodiimide>

The polycarbodiimide is a compound having two or more carbodiimide groups (—N=C=N—) in the molecule (polycarbodiimide compound). Conventional crosslinking agents perform two-point crosslinking in which two carboxyl groups are crosslinked by a single molecule of a crosslinking agent; however, polycarbodiimides are characteristically capable of performing multi-point crosslinking in which three or more carboxyl groups are crosslinked by a single molecule of a crosslinking agent, and this is believed to enhance the crosslinking between the elastomer molecules and thereby providing overwhelmingly higher fatigue durability as compared to other gloves formed by two-point crosslinking. In order to attain more favorable fatigue durability, the polycarbodiimide preferably contains three or more carbodiimide groups in the molecule, and the upper limit of the number of the carbodiimide groups contained in one molecule is not particularly restricted. The polycarbodiimide may be hereinafter referred to as "polycarbodiimide resin".

Along with the number of carbodiimide groups in the molecule, the number of carbodiimide groups contained in a molecule of the polycarbodiimide can be represented by "the polymerization degree of the polycarbodiimide". From the standpoint of allowing the polycarbodiimide to perform multi-point crosslinking of the elastomer and thereby obtaining a glove having good fatigue durability, the polymerization degree is preferably 4 or higher, more preferably 6 or higher, particularly preferably 9 or higher.

The polymerization degree of the polycarbodiimide is a value obtained by dividing the number-average molecular weight of the polycarbodiimide by the carbodiimide equivalent.

As for the carbodiimide equivalent, from the standpoint of improving the fatigue durability of the resulting glove, a polycarbodiimide having a carbodiimide equivalent in a range of 260 to 500 is used.

The carbodiimide equivalent is a value calculated using the following equation (I) from the carbodiimide group concentration measured by back titration with oxalic acid:

$$\text{Carbodiimide equivalent} = \text{Number of carbodiimide groups (40)} \times 100 / \text{Carbodiimide group concentration (\%)} \quad (I)$$

More particularly, as the polycarbodiimide, those produced by a variety of methods can be used and, basically, one produced by a conventional polycarbodiimide production method (see, for example, U.S. Pat. No. 2,941,956 (Specification), Japanese Patent Publication (Kokoku) No. S47-33279, J. Org. Chem., 28, 2,069 to 2,075 (1963), or Chemical Review 1981, Vol. 81, No. 4, 619 to 621) can be used. Specifically, the polycarbodiimide can be obtained by synthesizing an isocyanate-terminated polycarbodiimide by a condensation reaction involving decarboxylation of an organic diisocyanate.

In the above-described method, as the organic diisocyanate that is a raw material for the synthesis of the polycarbodiimide, for example, an aromatic diisocyanate, an aliphatic diisocyanate, an alicyclic diisocyanate, or a mixture thereof can be used. Specific examples thereof the organic diisocyanate include 1,5-naphthylene diisocyanate, 4,4-diphenylmethane diisocyanate, 4,4-diphenyldimethylmethane diisocyanate, 1,3-phenylene diisocyanate, 1,4-phenylene diisocyanate, 2,4-tolylene diisocyanate, 2,6-tolylene diisocyanate, a mixture of 2,4-tolylene diisocyanate and 2,6-tolylene diisocyanate, hexamethylene diisocyanate, cyclohexane-1,4-diisocyanate, xylylene diisocyanate, isophorone diisocyanate, dicyclohexylmethane-4,4-diisocyanate, methylcyclohexane diisocyanate, and tetramethylxylylene diisocyanate. From the standpoint of the weather resistance, it is preferred to incorporate a polycarbodiimide generated by a condensation reaction involving decarboxylation of an aliphatic or alicyclic diisocyanate.

The condensation reaction involving decarboxylation of an organic diisocyanate proceeds in the presence of a carbodiimidization catalyst. As this catalyst, for example, a phospholene oxide such as 1-phenyl-2-phospholene-1-oxide, 3-methyl-2-phospholene-1-oxide, 1-ethyl-2-phospholene-1-oxide, 3-methyl-1-phenyl-2-phospholene-1-oxide, or a 3-phospholene isomer of any of these phospholene oxides can be used and, thereamong, 3-methyl-1-phenyl-2- phospholene-1-oxide is preferred from the standpoint of the reactivity. It is noted here that the catalyst can be used in a catalytic amount.

Further, the polycarbodiimide to be used may be controlled to have an appropriate molecular polymerization degree using a compound that reacts with a terminal isocyanate, such as a monoisocyanate. Examples of the monoisocyanate used for capping an end of the polycarbodiimide to control the polymerization degree include monoisocyanates containing an aliphatic, alicyclic or aromatic hydrocarbon group having 1 to 18 carbon atoms, such as phenyl isocyanate, tolyl isocyanate, dimethylphenyl isocyanate, cyclohexyl isocyanate, butyl isocyanate and naphthyl isocyanate. In addition, as an end-capping agent, compounds having a —OH group, a —NH group, a —COOH group or a —SH group can be used as well.

The above-described compound that reacts with a terminal isocyanate, which is used for controlling the molecular weight, can be added at any timing of before, during and after the carbodiimidization reaction of the polycarbodiimide.

It is desired that the polycarbodiimide be maintained in a uniformly dispersed state at the time of being added to the above-described XNBR and, for this purpose, the polycarbodiimide can be emulsified using an appropriate emulsifying agent to be used as an emulsion.

In this case, as the emulsifying agent used for preparing an emulsion of the polycarbodiimide by emulsification, for example, nonionic surfactants, anionic surfactants, cationic surfactants and amphoteric surfactants can be employed; however, for blending of the polycarbodiimide with the XNBR having an anionic property, a nonionic surfactant or an anionic surfactant is suitable.

In the embodiments of the present invention, at least one polycarbodiimide is used in a self-emulsifiable or self-dissolving form by adding a hydrophilic segment to the molecular structure of the above-described polycarbodiimide.

The hydrophilic segment functions as a shell surrounding the polycarbodiimide moiety in water and thus protects the carbodiimide groups in the glove emulsion composition, thereby preventing the carbodiimide groups from reacting with water.

When water is eliminated by drying, the hydrophilic segment is opened and the carbodiimide groups appear as a result, allowing the polycarbodiimide to undergo a cross-linking reaction with the elastomer in a heat-drying process. It is not required that all of the polycarbodiimide compounds have a hydrophilic segment, and a mixture of a polycarbodiimide compound having a hydrophilic segment and a polycarbodiimide compound having no hydrophilic segment may be used as well. In this case, the polycarbodiimide compound having a hydrophilic segment is configured to surround the polycarbodiimide having no hydrophilic segment, so that superior stability in water is attained.

The self-emulsifiable or self-dissolving polycarbodiimide can be produced by synthesizing an isocyanate-terminated polycarbodiimide by a condensation reaction involving decarboxylation of an organic diisocyanate and subsequently adding thereto a hydrophilic segment having a functional group reactive with an isocyanate group.

Examples of the hydrophilic segment include the following compounds (1) to (4).

(1)

In this formula, $R^1$ is a lower alkyl group, and $R^2$ is an alkylene having 1 to 10 carbon atoms, a polyalkylene or an oxyalkylene. The number of the carbon atoms of the lower alkyl group is preferably 6 or less and, from the availability standpoint, it is preferably 4 or less. A quaternary ammonium salt of a dialkylaminoalcohol represented by the above formula (1) can be used and, particularly, a quaternary salt of 2-dimethylaminoethanol is preferred. In this case, the polycarbodiimide has cationic ionicity.

(2)

In this formula, $R^1$ and $R^2$ are the same as described above. A quaternary ammonium salt of a dialkylaminoalkylamine represented by the above formula (2) can be used and, particularly, a quaternary salt of 3-dimethylamino-n-propylamine is preferred. In this case, the polycarbodiimide has cationic ionicity.

(3)

In this formula, $R^3$ is an alkylene group having 1 to 10 carbon atoms, and $R^4$ is an alkali metal. An alkylsulfonate represented by the above formula (3), which has at least one reactive hydroxyl group, can be used and, particularly, sodium hydroxypropanesulfonate is preferred. In this case, the polycarbodiimide has anionic ionicity.

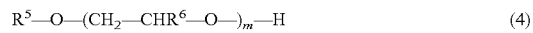
(4)

In this formula, $R^5$ is an alkyl group having 1 to 4 carbon atoms, $R^6$ is a hydrogen atoms or a methyl group, and m is an integer of 4 to 30.

A poly(ethylene oxide) capped with an alkoxy group at a terminal or a mixture of a poly(ethylene oxide) and a poly(propylene oxide), which is represented by the above formula (4), can be used and, particularly, a poly(ethylene oxide) capped with a methoxy group or an ethoxy group at a terminal is preferred. In this case, the polycarbodiimide has nonionic properties.

In the self-emulsifiable or self-dissolving polycarbodiimide, any one of the above-described hydrophilic segments (1) to (4) may be used singly, or a plurality thereof may be used in combination, and a hydrophobic segment having a —OH group, a —NH group, a —COOH group or a —SH group can also be used in combination within a range that does not impair the self-emulsifiable or self-dissolving property.

The glove emulsion composition according to the present embodiment is of an O/W type in which water is used as a solvent; therefore, by using a self-emulsifiable or self-dissolving polycarbodiimide having the above-described hydrophilic segment(s), the carbodiimide compound can stably exist in the emulsion composition. This is attributed to the structure in which the reactive carbodiimide groups or the carbodiimide structural units are protected by a terminal hydrophilic group, and it is believed that removal of water from the glove emulsion composition by drying causes the carbodiimide groups to be exposed, as a result of which the carbodiimide groups are crosslinked with the elastomer.

From the standpoint of the dispersibility in water, the molecular weight (number-average molecular weight measured by a GPC method) of the polycarbodiimide is preferably 500 or higher, more preferably 1,000 or higher, and preferably 5,000 or less, more preferably 4,000 or less.

The number-average molecular weight can be measured as follows by a GPC method (calculated in terms of polystyrene).

RI detector: RID-6A (manufactured by Shimadzu Corporation)

Columns: KF-806, KF-804L, and KF-804L (manufactured by Showa Denko K.K.)

Developing solvent: THF 1 ml/min

The carbodiimide group concentration can be quantitively determined as follows.

Using a Hiranuma automatic titrator COM-1700A (manufactured by Hiranuma Sangyo Co., Ltd.), a prescribed amount of an oxalic acid/dioxane solution having a known concentration is added to [B] g of the polycarbodiimide compound, and the solution and the polycarbodiimide compound are allowed to react sufficiently in tetrahydrofuran, after which the amount of unreacted oxalic acid is determined by potentiometric titration with an aqueous sodium hydroxide solution, and the molar amount (b) of oxalic acid reacted with the carbodiimide groups contained in the polycarbodiimide compound is calculated. From the thus obtained value, the molar amount (n=b/B) of the carbodiimide groups contained in 1 g of the polycarbodiimide compound is calculated, and the carbodiimide group concentration A (%) of the polycarbodiimide compound is determined using the following equation (II).

$$A = 40 \times n \times 100 \quad (II)$$

The polycarbodiimide used in the glove emulsion composition preferably includes at least one polycarbodiimide containing a hydrophilic segment, and a plurality of types of polycarbodiimides may be used in combination. For example, a polycarbodiimide containing a hydrophilic segment may be used in combination with a polycarbodiimide containing no hydrophilic segment.

From the standpoint of introducing a sufficient amount of crosslinked structures between the elastomer molecules to ensure fatigue durability, the content of the polycarbodiimide in the glove emulsion composition is generally preferably not less than 0.2% by weight, more preferably not less than 0.3% by weight, although it varies depending on the number of carbodiimide structural units contained in one molecule. Meanwhile, an excessively high content of the polycarbodiimide may rather deteriorate the properties of the elastomer; therefore, the content of the polycarbodiimide in the glove emulsion composition is preferably 5% by weight or less and, in practice, a content of about 3% by weight can impart the resulting glove with overwhelmingly higher fatigue durability than conventional gloves.

It is believed that not all of the carbodiimide groups contained in the polycarbodiimide are involved in the crosslinking reaction with carboxyl groups and, due to the effects of steric hindrance and the like, only some of the carbodiimide groups are crosslinked.

<pH Modifier>

As the pH modifier of the glove emulsion composition, an ammonium compound such as ammonia or ammonium hydroxide, and/or an amine compound such as ethylenediamine, triethylamine, triethylenetetramine or aminoethylaminoethanol, is/are used. The amount of the pH modifier to be used is usually 0.1 to 2.0 parts by weight or so with respect to 100 parts by weight of the solid content in the glove emulsion composition.

The pH of the glove emulsion composition is adjusted with the pH modifier. That is, in order to allow both the below-described crosslinking between carboxyl groups by calcium ions of a coagulant and the crosslinking by the polycarbodiimide to proceed smoothly, the pH of the glove emulsion composition is 9 or higher, preferably 9.5 or higher, more preferably 10 or higher. Meanwhile, from the standpoint of the ease of adjustment, the pH of the glove emulsion composition is preferably 11.5 or lower, more preferably 11 or lower.

In polycarbodiimide-crosslinked gloves, as described below, it is indispensable to use an ammonium compound or an amine compound as a pH modifier.

<Humectant>

The glove emulsion composition preferably contains a humectant. When a humectant is contained in the glove emulsion composition, opening of the hydrophilic segment of the polycarbodiimide caused by excessive drying in the drying step prior to the final heating step (precuring step) can be prevented at the time of the below-described dip-molding.

Examples of the humectant include polyols, among which a divalent or trivalent compound is preferably used. Specifically, examples of the divalent compound include ethylene glycol, propylene glycol, tetramethylene glycol, diethylene glycol, dipropylene glycol and polyethylene glycol, and examples of the trivalent compound include glycerine. Thereamong, the glove emulsion composition preferably contains glycerol as the humectant.

The amount of the humectant to be used is, for example, 1.0 to 5.0 parts by weight or so, preferably 1.5 to 3.0 parts by weight, with respect to 100 parts by mass of the elastomer contained in the glove emulsion composition (or the solid content of the glove emulsion composition).

<Other Components>

The glove emulsion composition contains at least the above-described indispensable components and water and, in addition thereto, the glove emulsion composition usually contains other optional components. For example, a mode in which the glove emulsion composition is prepared such that the crosslinked structures of the resulting glove consists of only crosslinked structures formed by the polycarbodiimide and calcium ions originating from the coagulant may be adopted.

The glove emulsion composition may further contain a dispersant. The dispersant is preferably an anionic surfactant, and examples thereof include carboxylates, sulfonates, phosphates, polyphosphates, high-molecular-weight alkyl aryl sulfonates, high-molecular-weight sulfonated naphthalenes, and high-molecular-weight naphthalene/formaldehyde condensation polymers, among which a sulfonate is preferably used.

As the dispersant, a commercially available product may be used. For example, TAMOL NN9104 can be used. The amount thereof to be used is preferably 0.5 to 2.0 parts by weight or so with respect to 100 parts by mass of the elastomer contained in the glove emulsion composition (or the solid content of the glove emulsion composition).

The glove emulsion composition may further contain a variety of other additives. Examples of the additives include an antioxidant, a pigment, and a chelating agent. As the antioxidant, a hindered phenol-type antioxidant, such as WINGSTAY L, can be used. Further, as the pigment, for example, titanium dioxide can be used. As the chelating agent, sodium ethylenediaminetetraacetate or the like can be used.

The glove emulsion composition according to the present embodiment can be prepared by mixing the XNBR, the polycarbodiimide and the pH modifier along with, as required, various additives such as a humectant, a dispersant and an antioxidant, and water using a commonly used mixing means, such as a mixer.

2. Method of Producing Glove

The glove according to the present embodiment can be more preferably produced by the following production method.

The order of the below-described steps is basically the same as in the production of common sulfur-vulcanized and zinc-crosslinked XNBR gloves; however, the contents of the steps are largely different. The reason for this is that a polycarbodiimide readily reacts with water and it is necessary to form crosslinks in such a manner that carboxyl groups of an elastomer are shared by calcium ions and carbodiimide groups and to thereby integrate the advantages of having excellent tensile strength and excellent fatigue durability, which are characteristic features of a crosslinks with calcium ions and a crosslinks with carbodiijimide groups, respectively. Accordingly, specific conditions were also required for the XNBR, the polycarbodiimide and the pH modifier that are contained in the glove emulsion composition. As for the production method as well, conditions that are totally different from those of conventional methods are required as represented by the gelling step.

That is, the method of producing a glove includes:

(1) the step of immersing a glove forming mold in a liquid coagulant containing calcium ions so as to allow the coagulant to adhere to the glove forming mold;

(2) the step of adjusting the pH to be 9 or higher using an ammonium compound or an amine compound and leaving a glove emulsion composition, which has the below-described formulation, to stand with stirring;

(3) the dipping step of immersing the glove forming mold, to which the coagulant has thus adhered in the step (1), in the glove emulsion composition;

(4) the gelling step of leaving the glove forming mold, to which the glove emulsion composition has thus adhered, to stand at a temperature for a period that satisfy the following conditions:

conditions: a temperature and a period that allow the calcium ions contained in the coagulant to infiltrate into an elastomer contained in the glove emulsion composition and to thereby induce gelation, without causing ammonium salts of the elastomer contained in the glove emulsion composition to be converted back to carboxyl groups and without causing a hydrophilic segment of a polycarbodiimide to be opened;

(5) the leaching step of removing impurities from a cured film precursor thus formed on the glove forming mold;

(6) the beading step of, after the leaching step, winding the cuff portion of the resulting glove;

(7) the precuring step of heating and drying the cured film precursor that has been subjected to the beading step; and (8) the curing step of heating the cured film precursor to obtain a cured film, the heating being performed at a temperature for a period that are sufficient for the ammonium salts of the elastomer to be converted back to carboxyl groups, the carbodiimide groups of the polycarbodiimide to be exposed, and the carboxyl groups of the elastomer to react with the carbodiimide groups, which steps (3) to (8) are performed in the order mentioned, wherein the glove emulsion composition includes, at least: an elastomer that contains an acrylonitrile or methacrylonitrile-derived structural unit, an unsaturated carboxylic acid-derived structural unit and a butadiene-derived structural unit in a polymer main chain; a polycarbodiimide; water; and a pH modifier selected from an ammonium compound and an amine compound, the elastomer has a Mooney viscosity ($ML_{(1+4)}$ (100° C.)) of 80 or higher, the elastomer contains the acrylonitrile or methacrylonitrile-derived structural unit in an amount of 20 to 40% by weight, the unsaturated carboxylic acid-derived structural unit in an amount of 1 to 10% by weight, and the butadiene-derived structural unit in an amount of 50 to 75% by weight, and the polycarbodiimide includes at least one polycarbodiimide containing a hydrophilic segment in its molecular structure.

The term "cured film precursor" used herein refers to a state where the carboxyl groups of the elastomer and the hydrophilic segment of the polycarbodiimide are maintained with the carbodiimide groups being not exposed and the carboxyl groups of the elastomer and the carbodiimide groups are not crosslinked with each other. The cured film precursor is in a state where the calcium ions contained in the coagulant have reacted with some of the carboxyl groups of the elastomer.

Examples of the coagulant include calcium nitrate and calcium hydrochloride. Thereamong, it is preferred to use calcium nitrate.

In a preferred embodiment, in more detail, a glove can be produced as follows.

(a) The step of immersing a mold or a former (glove forming mold) in a coagulant solution that contains $Ca^{2+}$ ions as a coagulant and a gelling agent in an amount of 5 to 40% by weight, preferably 8 to 35% by weight. In this step, the period of allowing the coagulant and the like to adhere to the surface of the mold or the former is determined as appropriate, and it is usually 10 to 20 seconds or so. As the coagulant solution, for example, an aqueous solution that contains 5 to 40% by weight of a coagulant such as calcium nitrate or calcium chloride, or a flocculant such as an inorganic salt having an effect of precipitating the elastomer, is used. It is preferred that the coagulant solution also contain potassium stearate, calcium stearate, a mineral oil, an ester-based oil or the like as a release agent in an amount of 0.5 to 2% by mass or so, for example, about 1% by weight.

(b) The step of drying the entirety or a part of the surface of the mold or the former, to which the coagulant has adhered, at a temperature of 50 to 70° C.

(c) The step of adjusting the pH to be 9 or higher using an ammonium compound or an amine compound and leaving a glove emulsion composition to stand for at least 5 hours with stirring. This step is also referred to as "aging". By performing this aging, the glove emulsion composition can be prevented from becoming heterogeneous, and this contributes to imparting a uniform finish to the resulting glove.

The aging can be performed for a period of, for example, 5 hours or longer, and it is preferred to perform the aging for at least 24 hours.

(d) The dipping step of immersing the mold or the former, which has been dried in the step (b), in the glove emulsion composition, for example, for a period of 1 to 60 seconds at a temperature of 25 to 35° C., and thereby allowing the glove emulsion composition to adhere to the mold or the former to which the coagulant has adhered. In this dipping step, the calcium ions contained in the coagulant cause the elastomer in the emulsion composition to aggregate on the surface of the mold or the former, whereby a film is formed. In this process, the carbodiimide groups of the polycarbodiimide are in a state of being protected by the hydrophilic segment.

As described above, the pH of the glove emulsion composition is adjusted to be 9 or higher by the pH modifier, such as ammonia or an amine compound. As a result, the carboxyl groups of the elastomer contained in the glove emulsion composition form ammonium salts (—COO$^-$NH$_4^+$) or amine salt (—COO$^-$NR$_3^+$). The R of the amine salts represents an organic group of the amine compound used as the pH modifier.

Further, in one embodiment of the present invention, a humectant may be incorporated into the glove emulsion composition. By incorporating a humectant, in the step prior to the curing step that is the final step, opening of the hydrophilic segment of the polycarbodiimide caused by drying and thus deactivation of the polycarbodiimide before crosslinking can be prevented. In addition, even under a certain level of strict drying conditions, the mold or the former to which the glove emulsion composition has adhered can be prevented from being dried more than necessary, so that unnecessary crosslinking reaction does not take place before the final crosslinking between the polycarbodiimide and the elastomer.

As the humectant, those exemplified above in the description of the emulsion composition can be used.

(e) The gelling step of leaving the mold or the former, to which the glove emulsion composition has adhered in the step (d), to stand under the below-exemplified conditions and thereby inhibiting elution of the elastomer in the subsequent leaching step. By performing this gelling step, the calcium ions contained in the coagulant infiltrate into the elastomer contained in the glove emulsion composition, which elastomer is in a simple aggregated state on the surface of the mold or the former, and form crosslinked structures, so that elution of the elastomer does not occur in the subsequent leaching step.

The gelling step included in the embodiments of the method of producing a glove according to the present invention is performed under totally different conditions from those of a conventionally known gelling step that is performed in a glove production method where an elastomer is crosslinked through zinc oxide and sulfur. Specifically, in the prior art, zinc and an elastomer are first crosslinked by heating and drying at a temperature of 80 to 120° C. and, after subsequently removing impurities by leaching, the resultant is further heated to allow, for example, a diene and sulfur that are contained in the elastomer to react with each other, whereby a glove is obtained. In such a conventional glove production process, even if zinc and the elastomer are excessively crosslinked, the subsequent crosslinking reaction between the diene and sulfur is not affected; therefore, there is no problem in performing the gelling over a long period at a high temperature of 80 to 120° C.

In contrast, in the method of producing a glove according to the embodiments of the present invention, the emulsion composition is gelled by the gelling step of allowing the calcium ions of the coagulant and the carboxyl groups of the elastomer to react with each other, and there are several restrictions on the conditions of the gelling step as described below.

For example, in cases where calcium nitrate is used as the coagulant for gelling and the pH adjustment is performed using ammonia, the calcium ions contained in the coagulant react with (—COO$^-$NH$_4^+$) of the elastomer contained in the emulsion composition to generate structures represented by ((—COO$^-$)$_2$Ca$^{2+}$) (hereinafter, also referred to as "(A)") and ammonium nitrate. In this process, some of the (—COO$^-$NH$_4^+$) moieties contained in the elastomer remain unreacted as ammonium salts (hereinafter, also referred to as "(B)"). In cases where the pH adjustment is performed using an amine compound, the calcium ions of the coagulant react with amine salts (—COO$^-$NR$_3^+$) of the elastomer. In cases where both ammonia and an amine compound are used as pH modifiers, the calcium ions of the coagulant react with both ammonium salts (—COO$^-$NH$_4^+$) and amine salts (—COO$^-$NR$_3^+$) of the elastomer.

The glove according to the embodiments of the present invention also contains, as described below, crosslinked structures formed by reaction between the above-described (B) and the carbodiimide groups of the polycarbodiimide, in addition to the bonds (the above-described (A)) formed by the carboxyl groups of the elastomer and calcium originating from the coagulant.

In the gelling step, when the reaction between (—COO$^-$NH$_4^+$) and/or (—COO$^-$NR$_3^+$) of the elastomer and the calcium ions overly proceeds, the ratio of (B) in the elastomer becomes excessively low and this leads to a reduction in the amount of the crosslinked structures formed by reaction between (B) and the carbodiimide groups of the polycarbodiimide in the resulting glove; therefore, such a condition needs to be avoided.

Meanwhile, the structures (A) represented by ((—COO$^-$)$_2$Ca$^{2+}$) in the elastomer are required for the elastomer to remain as a cured film precursor without being dissolved in the subsequent leaching step.

Therefore, for the gelling, it is preferred to set the conditions as appropriate taking into consideration the thickness and the like of the resulting glove and to, at the same time, make adjustments in such a manner to prevent the reaction yielding ((—COO$^-$)$_2$Ca$^{2+}$) from proceeding excessively while surely allowing the reaction to occur.

The ratio of (A) and (B) in the elastomer varies depending on the conditions of the gelling step.

The number of the bonds of the above-described (A) in the elastomer affects the tensile strength of the resulting glove, and the number of the bonds formed by reaction between (B) contained in the elastomer and the carbodiimide groups affects the fatigue durability.

Accordingly, the conditions of the gelling step may greatly affect the tensile strength and the fatigue durability of the resulting glove as a final product.

In view of the above, the conditions of the gelling step in the method of producing a glove according to the embodiments of the present invention are required to satisfy the following points.

(1) Calcium of the coagulant and ammonium salts and/or amine salts of the carboxyl groups of the elastomer moderately react with each other to be bound. The reason for this is that, when the gelling proceeds overly, the amount of the ammonium salts of the carboxy groups remaining in the elastomer becomes excessively small, leaving an insufficient amount of the carboxyl groups to be bound with the carbodiimide groups.

(2) The gelling step should not be performed at such a high temperature that converts ammonium salts (—COO$^-$NH$_4^+$) and/or amine salts (—COO$^-$NR$_3^+$) of the carboxyl groups of the elastomer contained in the emulsion composition into carboxyl groups (—COOH). The reason for this is as follows. In the glove emulsion composition according to one embodiment of the present invention, the pH is adjusted with an ammonia compound and/or an amine compound, and ammonium salts (—COO$^-$NH$_4^+$) and/or amine salts (—COO$^-$NR$_3^+$) are formed by the carboxyl groups of the elastomer. These salts are converted back to (—COOH) in the curing step and consequently react with the carbodiimide groups. Thus, when an excessively high temperature is used in the gelling step, the reaction that should be carried out in the curing step occurs in the gelling step.

(3) Such drying that causes the hydrophilic segment of the polycarbodiimide to open should not be performed. In the method of producing a glove according to the embodiments of the present invention, the polycarbodiimide contained in the emulsion composition has a hydrophilic segment. By the drying performed in the below-described curing step, the hydrophilic segment is opened and the carbodiimide groups are exposed, as a result of which the reaction with (—COOH) described in the above (2) occurs, and crosslinks are thereby formed. Thus, in the gelling step, it is necessary to avoid such excessive drying that causes the hydrophilic segment of the polycarbodiimide to open.

In view of the above, the following modes can be exemplified as the conditions of the gelling step in an embodiment of the present invention.

For those cases where no humectant is incorporated into the glove emulsion composition, examples of the conditions of the gelling step include a mode of leaving the glove emulsion composition to stand at room temperature (15 to 25° C., more specifically 23° C.) for 20 seconds to 20 minutes, preferably for 30 seconds to 10 minutes, and a mode of leaving the glove emulsion composition to stand at 50 to 70° C. for 20 seconds to less than 3 minutes, or for 30 seconds to 2 minutes.

In cases where a humectant is incorporated into the glove emulsion composition, as the conditions of the gelling step, the same conditions as those of the above-described cases where no humectant is incorporated can be adopted and, for example, a mode of leaving the glove emulsion composition at 50 to 70° C. for less than 20 minutes may be adopted as well.

In the gelling step, the term "leaving" means that an operation of, for example, adding a certain substance to the mold or the former to which the glove emulsion composition has adhered is not performed, and the term encompasses not only a state where the mold or the former is placed still, but also a state where, in an ordinary factory, the mold or the former is being moved on the production line without being placed still.

For any of the above-described conditions, basically, it is preferred to perform the "leaving" at an ambient temperature (room temperature) in the glove production, that is, not to perform heating. In the glove production, depending on the location of the factory, the ambient temperature (room temperature) can be about 23° C., or about 50° C. The above-mentioned temperature ranges take the locations of such factories into account and, even if the "leaving" is to be done at, for example, about 50° C., it is not basically expected to raise the temperature thereto by heating.

The gelling step may be performed, for example, under a condition of 40 to 60% RH.

(f) The leaching step of, after the above-described gelling step, washing the mold or the former, to which the elastomer has adhered, with water and thereby removing chemical agents. In this step, the mold or the former which is coated with the elastomer that has been partially dried is washed with water (leached) in hot water or warm water (30 to 70° C.) for 90 seconds to 10 minutes, preferably for 4 to 6 minutes.

By performing the leaching, components derived from the coagulant, such as calcium ions and nitrate ions, as well as components derived from the pH modifier, such as ammonium ions, are removed. As a result, excessive gelling can be inhibited. The ratio of (A) and (B) in the elastomer is determined when the leaching is performed.

(g) The step of drying the mold or the former, which has been washed with water (leached) in the above-described step (f), in a furnace at 80 to 120° C. After the completion of the leaching step, the beading (sleeve winding) step is performed. Then, the mold or the former is dried in a furnace at 60 to 80° C., more preferably 65 to 75° C., for 30 seconds to 3 minutes. By incorporating this step (g), partial expansion of the resulting glove that may occur due to rapid reduction in water content in the subsequent step (h) can be inhibited.

(h) The curing step of heating the mold or the former, which has been dried in the above-described step (g), at a temperature for a period that are sufficient for the ammonium salts of the elastomer to be converted back to carboxyl groups by a high temperature, the carbodiimide groups of the polycarbodiimide to be exposed, and the carboxyl groups of the elastomer and the carbodiimide groups of the polycarbodiimide to react with each other.

More specifically, the curing step is the step of crosslinking and curing the elastomer by, for example, heating at 120° C. to 150° C. for 20 to 30 minutes.

In this step (h), the elastomer is crosslinked by the polycarbodiimide and molecular chains are thereby formed, so that a variety of preferred properties can be imparted to the resulting glove. In other words, although some of the carboxyl groups of the elastomer form ammonium salts (—COO$^-$NH$_4$$^+$) and/or amine salts (—COO$^-$NR$_3$$^+$) in water, it is believed that these salts are converted back to carboxyl groups (COOH) as dehydration proceeds by drying, as a result of which the carboxyl groups react with the carbodiimide groups.

According to the studies conducted by the present inventors, as described above, when the pH modifier is an ammonium compound or an amine compound, the ammonium component or the amine component is released from carboxylate by heating to yield carboxyl groups; however, when the pH modifier is commonly-used potassium hydroxide, since it remains to stably exist as a carboxylate (—COO$^-$K$^+$) and is not converted back to a carboxyl group, there is a problem that the reaction with the carbodiimide groups is inhibited.

Further, the present inventors discovered that, although a carbodiimide group is naturally a functional group that shows the highest reactivity in an acidic to neutral condition, a cured film obtained from an XNBR in an acidic to neutral condition contains an unreacted carboxylic acid, and this consequently causes the cured film to be highly hygroscopic and sticky and to have insufficient tensile strength. Therefore, in the present embodiment, the reaction is performed in an alkaline condition.

According to the studies conducted by the present inventors, it has been clarified that it is impossible to allow all of the carboxyl groups contained in an elastomer to react with carbodiimide groups and, in the case of a common glove production method, even when a polycarbodiimide is used in an increased amount, the amount of the carboxyl groups of the elastomer that react with carbodiimide groups remains to be about half of the carboxyl groups and is usually, for example, 20 to 40% or so, and 25 to 30% or so in most cases. Therefore, in the production method according to the present embodiment, the crosslinking by the calcium ions of the coagulant component is also a very important constituent for improving the properties of the resulting grove, particularly the strength such as tensile strength. However, since the crosslinking by the calcium ions cannot solely ensure sufficient properties, it is also an important element to use an elastomer whose Mooney viscosity relating to the formation of crosslinked structures is at a certain level or higher.

For example, about 10 to 40% or about 20 to 30% of all of the carboxyl groups are crosslinked via covalent bonds by the polycarbodiimide, and at least some of the remaining carboxyl groups are crosslinked via ionic bonds formed by the calcium ions. By this, the amount of free carboxyl groups can be reduced to improve the tensile strength.

According to the studies conducted by the present inventions, conventional XNBR gloves are torn in about 3 to 4 hours in a fatigue durability test (test method is described below); however, surprisingly, the production method according to the present embodiment can provide not only gloves that are not torn after 6 hours in a fatigue durability test, but also gloves that are not torn even after 25 hours in a fatigue durability test. The present inventors also performed crosslinking of carboxyl groups using reactive organic compounds other than polycarbodiimide, such as a dihydrazide compound and ethylenediamine; however, such fatigue durability of a glove obtained in the present embodiment could not be realized.

3. Glove

The glove according the present embodiment is a glove composed of a cured film of an elastomer that contains an acrylonitrile or methacrylonitrile-derived structural unit, an unsaturated carboxylic acid-derived structural unit and a butadiene-derived structural unit in a polymer main chain and has a Mooney viscosity ($ML_{(1+4)}$ (100° C.)) of 80 or higher, the glove being characterized in that the cured film contains crosslinked structures formed by a polycarbodiimide and calcium ions. The crosslinked structures contained in the cured film may take, for example, a mode in which the crosslinked structures consist of only crosslinked structures that are formed by a polycarbodiimide and calcium ions.

This glove can be preferably produced using the above-described glove emulsion composition according to the present embodiment. The elastomer preferably contains the (meth)acrylonitrile-derived structural unit in an amount of 20 to 40% by weight, the unsaturated carboxylic acid-derived structural unit in an amount of 1 to 10% by weight, and the butadiene-derived structural unit in an amount of 50 to 75% by weight.

In another embodiment, the glove is preferably composed of a cured film of an elastomer that contains a (meth) acrylonitrile-derived structural unit, an unsaturated carboxylic acid-derived structural unit and a butadiene-derived structural unit in a polymer main chain, which cured film has a fatigue durability of 400 minutes or longer. The fatigue durability of the cured film is more preferably 500 minutes or longer.

It is noted here that the fatigue durability is represented by the time until a #1 dumbbell test piece according to JIS K6251 of 120 mm in length and 0.07 mm in thickness according to JIS K6251, which is prepared from the cured film, is torn when the test piece is repeatedly elongated and relaxed in the lengthwise direction between a maximum length of 195 mm and a minimum length of 147 mm by pulling the upper part of the test piece with the lower part of the test piece being immobilized and immersed in an artificial sweat solution up to a length of 60 mm. The elongation (195 mm) and the relaxation (147 mm) can be performed by repeating a cycle (12.5 seconds/cycle) of retaining the test piece in a relaxed state for 11 seconds, subsequently elongating the test piece to a length of 195 mm in 1.5 seconds and then allowing the test piece to relax back to a length of 147 mm.

More particularly, a fatigue durability test can be performed using such an apparatus as illustrated in FIG. 1 along with a dumbbell-shaped test piece in the same manner as in the case of performing a tensile test or the like of a rubber product. As illustrated in FIG. 1(a), the lower end of a test piece is immobilized with a clamp, and the test piece is immersed in an artificial sweat solution up to 60 mm. The upper end of the test piece is then clamped, and the test piece is elongated and relaxed in the vertical direction using an air pressure piston such that the test piece is brought into a relaxed state of FIG. 1(b)→an elongated state of FIG. 1(c)→a relaxed state of FIG. 1(b). Taking this elongation and contraction cycle of FIG. 1(b)→FIG. 1(c)→FIG. 1(b) as one cycle, the fatigue durability is evaluated by measuring the number of cycles and the time that are required for the test piece to be torn. The apparatus is configured such that a photoelectric sensor reacts to stop the operation when the test piece is torn.

As the artificial sweat solution, an aqueous solution which contains 20 g of sodium chloride, 17.5 g of ammonium chloride, 17.05 g of lactic acid and 5.01 g of acetic acid in 1 liter and whose pH has been adjusted to 4.7 with sodium hydroxide can be used.

The glove is composed of preferably a cured film having a tensile strength of 20 MPa or higher, more preferably a cured film having a tensile strength of 25 MPa or higher.

Further, it is preferred that the glove have an elongation at break of 400% to 750%, more preferably 400% to 700% or 400% to 650%, and a 100% modulus (tensile stress at an elongation of 100%) of 1.5 MPa to 10 MPa, more preferably 2 MPa to 10 MPa. It is noted here that the 100% modulus is a property used as an index value of the hardness (rigidity) of a glove.

In order to reduce the risk of allergy, it is preferred that the glove contain neither sulfur that is a crosslinking agent nor a sulfur compound that is a vulcanization accelerator, and that the content of elemental sulfur detected by neutralization titration of a combustion gas be 1% by weight or less with respect to the weight of the glove.

The glove according to the present embodiment has a major characteristic feature of having excellent fatigue durability. The fatigue durability is preferably 400 minutes or longer since the glove having such fatigue durability can be worn almost all day long, and such fatigue durability indicates that the glove has remarkably higher durability than conventional gloves.

The glove according to the present embodiment has sufficient mechanical properties (strength and rigidity) also as a thin glove. The thickness of the glove is not particularly restricted; however, it is preferably 0.04 to 0.35 mm, more preferably 0.04 to 0.3 mm.

When the glove according to the present embodiment is used as a thin glove, the thickness thereof is preferably 0.04 to 0.15 mm, while when the glove is used as a thick glove, the thickness thereof is preferably greater than 0.15 mm to 0.4 mm.

EXAMPLES

The present invention will now be described in more detail by way of examples thereof; however, the present invention is not restricted to the following examples by any means. Hereinafter, unless otherwise specified, "%" means "% by weight" and "part(s)" means "part(s) by weight".

<Production of Polycarbodiimide Crosslinking Agents>

(1) Production of Polycarbodiimide Emulsion (Crosslinking Agent A)

(Synthesis of Polycarbodiimide A)

To a reaction vessel equipped with a reflux condenser and a stirrer, 800 g of dicyclohexylmethane-4,4'-diisocyanate and 4 g of a carbodiimidization catalyst (3-methyl-1-phenyl-2-phospholene-1-oxide) were added, and these materials were allowed to react under a nitrogen gas flow at 190° C. for 17 hours to obtain an isocyanate-terminated 4,4'-dicyclohexylmethane polycarbodiimide (polymerization degree=6).

The reaction vessel was subsequently cooled to 120° C., and 435 g of polyethylene glycol monomethyl ether (average molecular weight=500) was added thereto and allowed to react for 1 hour at the same temperature with stirring. Then, the reaction vessel was heated again to 150° C., and the materials were allowed to further react for 5 hours with stirring. After confirming the disappearance of the absorption of isocyanate group at a wavelength of 2,200 to 2,300 $cm^{-1}$ by infrared (IR) absorption spectroscopy, the resultant was taken out of the reaction vessel and cooled to room temperature, whereby a polycarbodiimide A in the form of a pale-yellow transparent liquid was obtained.

(Synthesis of Polycarbodiimide B)

To a reaction vessel equipped with a reflux condenser and a stirrer, 800 of dicyclohexylmethane-4,4'-diisocyanate, 153 g of cyclohexylisocyanate and 10 g of a carbodiimidization catalyst (3-methyl-1-phenyl-2-phospholene-1-oxide) were added, and these materials were allowed to react under a nitrogen gas flow at 180° C. for 56 hours.

After confirming the disappearance of the absorption of isocyanate group at a wavelength of 2,200 to 2,300 $cm^{-1}$ by infrared (IR) absorption spectroscopy, the resultant was taken out of the reaction vessel and cooled to room temperature, whereby a polycarbodiimide B in the form of a pale-yellow transparent liquid was obtained.

(Preparation of Polycarbodiimide Emulsion)

To a reaction vessel equipped with a reflux condenser and a stirrer, 40 g of the polycarbodiimide A and 60 g of the polycarbodiimide B were added, and these polycarbodiimides were stirred under a nitrogen gas flow at 150° C. for 4 hours. Then, the reaction vessel was cooled to about 80° C., and 18.8 g of an aqueous sodium dodecylbenzenesulfonate solution (active ingredient: 16%) as a surfactant and water were added thereto, whereby a milky white polycarbodiimide emulsion having a solid content of 43% (crosslinking agent A) was obtained.

The thus obtained emulsion had a carbodiimide equivalent (chemical formula weight per 1 mole of carbodiimide groups; molecular weight of polycarbodiimides/number of carbodiimide groups contained in one molecule) of 301 and a number-average molecular weight, which was determined by GPC, of 1,800. From the carbodiimide equivalent and the number-average molecular weight, the polymerization degree was calculated to be 5.98.

(2) Production of Polycarbodiimide Solution (Crosslinking Agent B)

To a 5,000-ml reaction vessel equipped with a reflux condenser and a stirrer, 1,572 g of dicyclohexylmethane-4,4'-diisocyanate and 15.7 g of a carbodiimidization catalyst (3-methyl-1-phenyl-2-phospholene-1-oxide) were added, and these materials were stirred under a nitrogen gas flow at 185° C. for 22 hours to obtain an isocyanate-terminated 4,4'-dicyclohexylmethane polycarbodiimide (polymerization degree=6).

The reaction vessel was subsequently cooled to 120° C., and 686 g of polyethylene glycol monomethyl ether (average molecular weight=400) was added thereto and allowed to react for 1 hour at the same temperature with stirring. Then, the reaction vessel was heated again to 150° C., and the materials were allowed to further react for 5 hours with stirring. After confirming the disappearance of the absorption of isocyanate group at a wavelength of 2,200 to 2,300 $cm^{-1}$ by infrared (IR) absorption spectroscopy, the reaction vessel was cooled to about 80° C. and water was added thereto, whereby a pale-yellow transparent polycarbodiimide solution having a solid content of 40% (crosslinking agent B) was obtained.

The thus obtained solution had a carbodiimide equivalent of 395 and a number-average molecular weight, which was determined by GPC, of 3,700. From the carbodiimide equivalent and the number-average molecular weight, the polymerization degree was calculated to be 9.37.

(3) Production of Polycarbodiimide Solution (Crosslinking Agent C)

An isocyanate-terminated m-tetramethylxylylene polycarbodiimide (polymerization degree=15) was obtained by allowing 1,400 g of m-tetramethylxylylene diisocyanate to react with 28 g of a carbodiimidization catalyst (3-methyl-1-phenyl-2-phospholene-1-oxide) at 180° C. for 58 hours.

The reaction vessel was subsequently cooled to 120° C., and 573 g of polyethylene glycol monomethyl ether (average molecular weight=800) was added thereto and allowed to react for 1 hour at the same temperature with stirring. Then, the reaction vessel was heated again to 150° C., and the materials were allowed to further react for 5 hours with stirring. After confirming the disappearance of the absorption of isocyanate group at a wavelength of 2,200 to 2,300 $cm^{-1}$ by infrared (IR) absorption spectroscopy, the reaction vessel was cooled to about 80° C. and water was added thereto, whereby a yellow transparent polycarbodiimide solution having a solid content of 40% (crosslinking agent C) was obtained.

The thus obtained solution had a carbodiimide equivalent of 323 and a number-average molecular weight, which was determined by GPC, of 2,300. From the carbodiimide equivalent and the number-average molecular weight, the polymerization degree was calculated to be 7.12.

(4) Preparation of Polycarbodiimide Emulsion (Crosslinking Agent D)

To a reaction vessel equipped with a reflux condenser and a stirrer, 90 g of the polycarbodiimide A and 10 g of the polycarbodiimide B were added, and these polycarbodiimides were stirred under a nitrogen gas flow at 150° C. for 4 hours. Then, the reaction vessel was cooled to about 80° C. and water was added thereto, whereby a milky white polycarbodiimide emulsion having a solid content of 40% (crosslinking agent D) was obtained.

The thus obtained emulsion had a carbodiimide equivalent of 407 and a number-average molecular weight, which was determined by GPC, of 3,500. From the carbodiimide equivalent and the number-average molecular weight, the polymerization degree was calculated to be 8.60.

(5) Production of Polycarbodiimide Emulsion (Crosslinking Agent E)

To a 5,000-ml reaction vessel equipped with a reflux condenser and a stirrer, 1,572 g of dicyclohexylmethane-4,4'-diisocyanate and 15.7 g of a carbodiimidization catalyst (3-methyl-1-phenyl-2-phospholene-1-oxide) were added, and these materials were stirred under a nitrogen gas flow at 180° C. for 15 hours to obtain an isocyanate-terminated 4,4'-dicyclohexylmethane polycarbodiimide (polymerization degree=4).

The reaction vessel was subsequently cooled to 120° C., and 150 g of polyethylene glycol monomethyl ether (average molecular weight=500) and 283 g of N,N-diethylisopropanolamine were added thereto and allowed to react for 1 hour at the same temperature with stirring. Then, the reaction vessel was heated again to 150° C., and the materials were allowed to further react for 5 hours with stirring. After confirming the disappearance of the absorption of isocyanate group at a wavelength of 2,200 to 2,300 $cm^{-1}$ by infrared (IR) absorption spectroscopy, the reaction vessel was cooled to about 80° C. and water was added thereto, whereby a milky white polycarbodiimide emulsion having a solid content of 40% (crosslinking agent E) was obtained.

The thus obtained emulsion had a carbodiimide equivalent of 327 and a number-average molecular weight, which was determined by GPC, of 1,500. From the carbodiimide equivalent and the number-average molecular weight, the polymerization degree was calculated to be 4.59.

<Production of Elastomers>

An emulsified solution composed of 120 parts of ion-exchanged water, 30 parts of acrylonitrile, 64.2 parts of 1,3-butadiene, 5.8 parts of methacrylic acid, 3 parts of sodium dodecylbenzenesulfonate, 0.3 parts of potassium persulfate and 0.05 parts of sodium ethylenediaminetetraacetate was added to a pressure-resistant polymerization reactor equipped a stirrer, and allowed to react for 12 to 24 hours with the temperature being maintained at 50° C. After removing unreacted monomers from the thus obtained copolymer latex, the pH and the concentration of the copolymer latex were adjusted to obtain a solution of XNBR-A. The Mooney viscosity and the MEK-insoluble content of the XNBR-A were as shown in Table 1.

Solutions of XNBR-B to XNBR-N shown in Table 1 were each produced in the same manner as the XNBR-A, except that the amounts of the respective raw material compounds were changed.

<Production of Glove Emulsion Compositions (Latexes)>

To a 1-L beaker (manufactured by AS ONE Corporation, 105 mm in body diameter×150 mm in height), 220 g of each XNBR solution (solid content: 45%) shown in Table 1 was added, and the solution was subsequently diluted by adding thereto 200 g of water, followed by initiation of stirring. After preliminarily adjusting the pH to be about 9.9 using aqueous ammonia, each crosslinking agent shown in Table 1 was added in the amount shown in Table 1. Further, 0.4 g of an antioxidant (trade name "CVOX-50", manufactured by Farben Technique (M) Sdn. Bhd.) and 1.5 g of titanium oxide (trade name "PW-601", manufactured by Farben Technique (M) Sdn. Bhd.) were added and, after adjusting the resulting solution with ammonia to have a pH of 10.5, water was further added thereto such that a solid concentration of 22% was attained, and the resultant was mixed for 24 hours. The amount of the thus obtained glove emulsion composition was 486 g. It is noted here that the glove emulsion composition was continuously stirred in the beaker until use.

The properties of the respective XNBRs shown in Table 1 were measured as follows.

<Amount of Acrylonitrile (AN) Residues and Amount of Unsaturated Carboxylic Acid (MMA) Residues>

Each elastomer was dried to prepare a film. This film was analyzed by FT-IR to determine the absorbance (Abs) at an absorption wavelength of 2,237 $cm^{-1}$, which is attributed to acrylonitrile groups, and the absorbance (Abs) at an absorption wavelength of 1,699 $cm^{-1}$, which is attributed to carboxylate groups, and the amount of acrylonitrile (AN) residues and the amount of unsaturated carboxylic acid (MMA) residues were determined.

The amount of acrylonitrile residues (%) was determined from a calibration curve that had been prepared in advance. The calibration curve was prepared using samples that were obtained by adding polyacrylic acid as an internal standard substance to the respective elastomers and had a known amount of acrylonitrile groups. The amount of unsaturated carboxylic acid residues was calculated using the following equation.

$$\text{Amount of unsaturated carboxylic acid residues (\% by weight)} = [\text{Abs}(1,699\ cm^{-1})/\text{Abs}(2,237\ cm^{-1})]/0.2661$$

In this equation, the coefficient 0.2661 was calculated from a calibration curve that was prepared using a plurality of samples each having a known ratio of unsaturated carboxylate groups and acrylonitrile groups.

<Mooney Viscosity ($ML_{(1+4)}$)>

To 200 ml of a saturated aqueous solution of a 4:1 mixture of calcium nitrate and calcium carbonate in a state of being stirred at room temperature, each elastomer latex was added dropwise using a pipette to precipitate a solid rubber. The thus precipitated solid rubber was taken out and repeatedly washed 10 times in about 1 L of ion-exchanged water with stirring, after which the solid rubber was dehydrated by squeezing and subsequently vacuum-dried (60° C., 72 hours), whereby a measurement rubber sample was prepared. The thus obtained measurement rubber sample was passed through 6-inch rolls having a roll temperature of 50° C. and a roll gap of about 0.5 mm several times until the rubber was settled, and the Mooney viscosity of this rubber sample was measured at 100° C. using a large-diameter rotator in accordance with JIS K6300-1: 2001 "Rubber, Unvulcanized—Physical Property—Part 1: Determination of Mooney viscosity and pre-vulcanization characteristics with Mooney viscometer".

<MEK-Insoluble Content>

The MEK (methyl ethyl ketone)-insoluble (gel) component was quantified as follows. An XNBR latex dry sample in an amount of 0.2 g was placed in a mesh basket (80-mesh) whose weight had been measured, and the whole basket was immersed into 80 mL of MEK solvent in a 100-mL beaker. The beaker was subsequently capped with parafilm and left to stand for 48 hours in a draft. Thereafter, the mesh basket was taken out of the beaker, hung in the draft, and dried for 1 hour. After vacuum-drying the basket at 105° C. for 1 hour, the weight thereof was measured, and the post-immersion weight of the XNBR latex dry sample was determined by subtracting the weight of the basket from the thus measured weight.

The content ratio of the MEK-insoluble component (insoluble content) was calculated using the following equation.

$$\text{Content ratio of insoluble component (\% by weight)} = (\text{Post-immersion weight (g)}/\text{Pre-immersion weight (g)}) \times 100$$

The XNBR latex dry sample was prepared as follows. That is, in a 500-mL bottle, an XNBR latex of interest was stirred for 30 minutes at a rotation speed of 500 rpm, and 14 g of the latex was subsequently weighed on a 180 mm×115 mm stainless-steel vat and dried overnight at room temperature. This latex was further dried at 50° C. for 24 hours to prepare a cast film, which was subsequently cut into a 5-mm square to obtain an XNBR latex dry sample.

<Preparation of Liquid Coagulant>

After diluting 23.6 g of "S-9" (trade name, solid concentration: 25.46%, manufactured by Crestage Industry Sdn. Bhd.) by about 2-fold using a portion of 50 g of water that had been previously weighed, the thus diluted S-9 was slowly added as a dispersant to a solution obtained by dissolving 0.67 g of a wetting agent "TERIC 320" (trade name, manufactured by Huntsman Corporation) in 36.9 g of water. The whole amount of the S-9 was added while washing out the residual S-9 in the container with remaining water, and the resultant was stirred for 3 to 4 hours. Separately, in a 1-L beaker (manufactured by AS ONE Corporation, 105 mm in body diameter×150 mm in height), an aqueous calcium nitrate solution was prepared by dissolving 143.9 g of calcium nitrate tetrahydrate in 114.5 g of water, and the above-prepared S-9 dispersion was added thereto with stirring. The resultant was adjusted with 5% aqueous ammonia to have a pH of 8.5 to 9.5, and water was further added thereto such that the solid concentration of calcium nitrate as an anhydride and that of the S-9 were eventually 20% and 1.2%, respectively, whereby 500 g of a liquid coagulant was obtained. The thus obtained liquid coagulant was continuously stirred in the 1-L beaker until use.

<Production of Cured Films>

The liquid coagulant obtained above was heated to 50° C. with stirring, filtered through a 200-mesh nylon filter, and then added to an immersion vessel, after which a plate made of ceramic (200 mm×80 mm×3 mm; hereinafter, referred to as "ceramic plate") that had been washed and then heated to 60° C. was immersed therein. Specifically, once a tip of the ceramic plate was brought into contact with the surface of the liquid coagulant, the ceramic plate was immersed to a position of 18 cm from the tip over a period of 4 seconds, and this immersed state was maintained for 4 seconds before pulling out the ceramic plate over a period of 3 seconds. Then, the liquid coagulant adhering to the surface of the ceramic plate was promptly shaken off, and the surface of the ceramic plate was dried. The thus dried ceramic plate was heated again to 60° C. in preparation for the subsequent immersion in a glove emulsion composition (latex).

The glove emulsion compositions (latexes) obtained above were each filtered through a 200-mesh nylon filter at room temperature and then added to an immersion vessel, after which the above-described 60° C. ceramic plate to which the liquid coagulant was adhered was immersed therein. Specifically, the ceramic plate was immersed over a period of 6 seconds, maintained for 4 seconds, and then pulled out over a period of 3 seconds. The ceramic plate was held in the air until the latex no longer dripped, and droplets of the latex adhering to the tip were lightly shaken off.

The ceramic plate immersed in the latex was left to stand at room temperature (23° C.) for 1 minute and subsequently leached with 50° C. warm water for 5 minutes. Thereafter, the ceramic plate was dried at 70° C. for 1 minute and then heat-cured at 120° C. for 30 minutes.

The thus obtained cured film (average thickness: 0.07 mm) was cleanly peeled off from the ceramic plate and stored at a temperature of 23° C.±2° C. and a humidity of 50%±10% until being subjected to the physical property tests.

<Evaluation of Cured Films>

(1) Tensile Strength

From each cured film, a #5 dumbbell test piece according to JIS K6251 was cut out, and the tensile strength (MPa) thereof was measured using a TENSILON universal tensile tester RTC-1310A manufactured by A&D Co., Ltd. at a test rate of 500 mm/min, a chuck distance of 75 mm, and a gauge mark distance of 25 mm.

(2) Fatigue Durability

A #1 dumbbell test piece according to JIS K6251 was cut out from each cured film and immersed in an artificial sweat solution (which contained 20 g of sodium chloride, 17.5 g of ammonium chloride, 17.05 g of lactic acid and 5.01 g of acetic acid in 1 liter and whose pH had been adjusted to 4.7 with sodium hydroxide), and the fatigue durability was evaluated using the above-described durability test apparatus.

That is, using the apparatus illustrated in FIG. 1, the dumbbell test piece of 120 mm in length was held by a fixed chuck and a mobile chuck at 15 mm away from each of the two ends, and the test piece was immersed in the artificial sweat solution up to 60 mm from the lower end on the side of the fixed chuck. After moving the mobile chuck to a minimum position (relaxed state) where the test piece had a length of 147 mm (123%) and maintaining the mobile chuck at this position for 11 seconds, the mobile chuck was moved to a maximum position (elongated state) where the test piece had a length of 195 mm (163%) and then moved back to the minimum position (relaxed state) in 1.5 seconds. A cycle test was performed taking these moving operations as one cycle. The fatigue durability time (minutes) was determined by multiplying the duration of each cycle, which was 12.5 seconds, by the number of the cycles until the test piece was torn.

The details and the results of Experimental Examples are shown in Table 1. In the Table, Experimental Examples 2 and 3 are comparative examples of the present embodiment, where the crosslinking agent was not a polycarbodiimide. In Experimental Examples 1 and 4 to 16, a variety of XNBRs were used.

From the results of Experimental Examples 1 and 4 to 16, it was demonstrated that, even when the crosslinking agent E is incorporated into glove emulsion compositions as a crosslinking agent in an amount of 3% by weight and XNBRs having different Mooney viscosity values are used, sufficient tensile strength can be obtained as long as the Mooney viscosity is 80 or higher.

From the results of Experimental Examples 12 and 13, it was found that the fatigue durability largely varies around a Mooney viscosity of 160.

Experimental Examples 14 to 16 are comparative examples of the present embodiment, where the XNBRs had a Mooney viscosity of less than 80. In Experimental Examples 14 to 16 where the XNBRs had a Mooney viscosity of less than 80, the tensile strength was poor.

Further, Experimental Examples 17 to 23 are experimental examples where the type or the concentration of the polycarbodiimide was changed.

From the results of Experimental Examples 17 to 20, it was found that sufficient fatigue durability and tensile strength were attained even when a crosslinking agent other than the crosslinking agent E was used in an amount of 1% by weight.

From the results of Experimental Examples 21 to 23, it was found that, although the crosslinking agent E can be incorporated in an amount of up to 10% by weight, the amount is desirably 3 to 7% by weight or so for attaining sufficient fatigue durability.

TABLE 1

|  |  | Experimental Example 1 | Experimental Example 2 | Experimental Example 3 | Experimental Example 4 | Experimental Example 5 | Experimental Example 6 |
|---|---|---|---|---|---|---|---|
| Latex | Type | A | A | A | B | C | D |
|  | Mooney Viscosity ($M_L$ $_{(1+4)}$ 100° C.) | 111 | 111 | 111 | 115 | 90 | 94 |
|  | MEK-insoluble content (% by weight) | 5.6 | 5.6 | 5.6 | 58 | 47 | 0.6 |
|  | Amount of MMA (COOH) (% by weight) | 5.3 | 5.3 | 5.3 | 5.5 | 4 | 5.8 |
|  | Amount of AN (% by weight) | 28 | 28 | 28 | 27 | 26 | 26 |
| Cross-linking agent | Polycarbodiimide Type | E | — | — | E | E | E |
|  | Content (% by weight) | 3 | — | — | 3 | 3 | 3 |
|  | ZnO content (% by weight) | — | — | 3 | — | — | — |
|  | pH | 10.5 | 10.5 | 10.5 | 10.5 | 10.5 | 10.5 |
|  | pH modifier | $NH_3$ | $NH_3$ | $NH_3$ | $NH_3$ | $NH_3$ | $NH_3$ |
|  | Tensile strength (MPa) | 38 | 25 | 46 | 31 | 33 | 27 |
|  | Fatigue durability (min) | >1,500 | 50 | 80 | >1,500 | >1,500 | >1,500 |

|  |  | Experimental Example 7 | Experimental Example 8 | Experimental Example 9 | Experimental Example 10 | Experimental Example 11 | Experimental Example 12 |
|---|---|---|---|---|---|---|---|
| Latex | Type | E | F | G | H | I | J |
|  | Mooney Viscosity ($M_L$ $_{(1+4)}$ 100° C.) | 95 | 129 | 127 | 134 | 142 | 156 |
|  | MEK-insoluble content (% by weight) | 60 | 46 | 60 | 51 | 27 | 64 |
|  | Amount of MMA (COOH) (% by weight) | 3.1 | 4 | 2.3 | 6.5 | 2.4 | 2.9 |
|  | Amount of AN (% by weight) | 26 | 32 | 26 | 35 | 27 | 28 |
| Cross-linking agent | Polycarbodiimide Type | E | E | E | E | E | E |
|  | Content (% by weight) | 3 | 3 | 3 | 3 | 3 | 3 |
|  | ZnO content (% by weight) | — | — | — | — | — | — |
|  | pH | 10.5 | 10.5 | 10.5 | 10.5 | 10.5 | 10.5 |
|  | pH modifier | $NH_3$ | $NH_3$ | $NH_3$ | $NH_3$ | $NH_3$ | $NH_3$ |
|  | Tensile strength (MPa) | 29 | 35 | 30 | 32 | 33 | 34 |
|  | Fatigue durability (min) | >1,500 | >1,500 | >1,500 | >1,500 | >1,500 | 800 |

|  |  | Experimental Example 13 | Experimental Example 14 | Experimental Example 15 | Experimental Example 16 | Experimental Example 17 | Experimental Example 18 | Experimental Example 19 |
|---|---|---|---|---|---|---|---|---|
| Latex | Type | K | L | M | N | A | A | A |
|  | Mooney Viscosity ($M_L$ $_{(1+4)}$ 100° C.) | 175 | 76 | 72 | 70 | 111 | 111 | 111 |
|  | MEK-insoluble content (% by weight) | 95 | 50 | 41 | 52 | 5.6 | 5.6 | 5.6 |
|  | Amount of MMA (COOH) (% by weight) | 8.3 | 1.5 | 3.1 | 2.7 | 5.3 | 5.3 | 5.3 |
|  | Amount of AN (% by weight) | 35 | 26 | 26 | 29 | 28 | 28 | 28 |
| Cross-linking agent | Polycarbodiimide Type | E | E | E | E | A | D | C |
|  | Content (% by weight) | 3 | 3 | 3 | 3 | 1 | 1 | 1 |
|  | ZnO content (% by weight) | — | — | — | — | — | — | — |
|  | pH | 10.5 | 10.5 | 10.5 | 10.5 | 10.5 | 10.5 | 10.5 |
|  | pH modifier | $NH_3$ | $NH_3$ | $NH_3$ | $NH_3$ | $NH_3$ | $NH_3$ | $NH_3$ |
|  | Tensile strength (MPa) | 39 | 16 | 19 | 18 | 25 | 29 | 30 |
|  | Fatigue durability (min) | 211 | >1,500 | >1,500 | >1,500 | 970 | 530 | 720 |

|  |  | Experimental Example 20 | Experimental Example 21 | Experimental Example 22 | Experimental Example 23 | Experimental Example 24 | Experimental Example 25 |
|---|---|---|---|---|---|---|---|
| Latex | Type | A | A | A | A | A | A |
|  | Mooney Viscosity ($M_L$ $_{(1+4)}$ 100° C.) | 111 | 111 | 111 | 111 | 111 | 111 |
|  | MEK-insoluble content (% by weight) | 5.6 | 5.6 | 5.6 | 5.6 | 5.6 | 5.6 |
|  | Amount of MMA (COOH) (% by weight) | 5.3 | 5.3 | 5.3 | 5.3 | 5.3 | 5.3 |
|  | Amount of AN (% by weight) | 28 | 28 | 28 | 28 | 28 | 28 |

TABLE 1-continued

| Cross-linking agent | Polycarbodiimide | Type | B | E | E | E | D | E |
|---|---|---|---|---|---|---|---|---|
| | | Content (% by weight) | 1 | 5 | 7 | 10 | 0.5 | 3 |
| | ZnO content (% by weight) | | — | — | — | — | — | — |
| | pH | | 10.5 | 10.5 | 10.5 | 10.5 | 10.5 | 10.5 |
| | pH modifier | | $NH_3$ | $NH_3$ | $NH_3$ | $NH_3$ | $NH_3$ | KCH |
| | Tensile strength (MPa) | | 28 | 35 | 33 | 26 | 32 | 17 |
| | Fatigue durability (min) | | 510 | >1,500 | >1,500 | 450 | 650 | — |

As shown in the above-described Experimental Examples, according to the present embodiment where an XNBR having a specific Mooney viscosity is crosslinked with a polycarbodiimide, a glove having excellent tensile strength and fatigue durability can be provided. Further, a glove having a tensile strength of 20 MPa or higher and a fatigue durability of 400 minutes or longer can also be provided.

As Experimental Example 24, a glove emulsion composition having a polycarbodiimide content of 0.5% by weight was prepared. Even when the polycarbodiimide content in the glove emulsion composition was 0.5% by weight, sufficient fatigue durability and tensile strength were attained.

As Experimental Example 25, a glove emulsion composition having a pH adjusted with potassium hydroxide was prepared. When the pH was adjusted with potassium hydroxide, sufficient tensile strength could not be attained, and the fatigue durability test was thus not performed.

In the above-described Experimental Examples 1 to 25, no humectant was incorporated into the glove emulsion compositions.

In the below-described Experimental Examples 26 to 28, in order to examine the effect of the presence or absence of a humectant, gloves were each produced by the same procedure as in the above-described Experimental Example 1, except that a glove emulsion composition which employed a latex A and contained 1% by weight of the polycarbodiimide D with or without a humectant (glycerol) was used, and that the gelling prior to the leaching was performed at 50° C. for 3 minutes.

For each of the thus obtained gloves, the conditions of the raw materials as well as the results of testing the fatigue durability and the tensile strength are shown in Table 2 below.

According to the results shown in Table 2, even when the gelling was performed under such a condition of 50° C. for 3 minutes that allows drying to proceed relatively easily, sufficient tensile strength and fatigue durability were attained in those Experimental Examples where a humectant was incorporated.

TABLE 2

| | | | Experimental Example 26 | Experimental Example 27 | Experimental Example 28 |
|---|---|---|---|---|---|
| Latex | Type | | A | A | A |
| | Mooney Viscosity ($ML_{1+4}$ 100° C.) | | 111 | 111 | 111 |
| | MEK-insoluble content (% by weight) | | 5.6 | 5.6 | 5.6 |
| | Amount of MMA (COOH) (% by weight) | | 5.3 | 5.3 | 5.3 |
| | Amount of AN (% by weight) | | 28 | 28 | 28 |

TABLE 2-continued

| | | | Experimental Example 26 | Experimental Example 27 | Experimental Example 28 |
|---|---|---|---|---|---|
| Cross-linking agent | Polycarbodiimide | Type | D | D | D |
| | | Content (% by weight) | 1 | 1 | 1 |
| Humectant content (phr) | | | — | 1.25 | 2.5 |
| pH | | | 10.5 | 10.5 | 10.5 |
| pH modifier | | | $NH_3$ | $NH_3$ | $NH_3$ |
| Tensile strength (MPa) | | | 41 | 39 | 37 |
| Fatigue durability (min) | | | 266 | 465 | 637 |

The below-described Experimental Examples 29 to 31 demonstrate the performances of gloves that were obtained by incorporating no humectant into the respective glove emulsion compositions and performing the gelling step at 50° C. for 20 minutes. When the gelling step was performed at 50° C. for 20 minutes, the tensile strength and the fatigue durability were both poor as compared to the cases where the gelling step was performed at 23° C. for 1 minute (Experimental Examples 17, 18 and 20).

TABLE 3

| | | | Experimental Example 29 | Experimental Example 30 | Experimental Example 31 |
|---|---|---|---|---|---|
| Latex | Type | | A | A | A |
| | Mooney Viscosity ($ML_{1+4}$ 100° C.) | | 111 | 111 | 111 |
| | MEK-insoluble content (% by weight) | | 5.6 | 5.6 | 5.6 |
| | Amount of MMA (COOH) (% by weight) | | 5.3 | 5.3 | 5.3 |
| | Amount of AN (% by weight) | | 28 | 28 | 28 |
| Cross-linking agent | Polycarbodiimide | Type | D | A | B |
| | | Content (% by weight) | 1 | 1 | 1 |
| pH | | | 10.5 | 10.5 | 10.5 |
| pH modifier | | | $NH_3$ | $NH_3$ | $NH_3$ |
| Tensile strength (MPa) | | | 18 | 17 | 18 |
| Fatigue durability (min) | | | 473 | 485 | 467 |

Experimental Examples 32 and 33 were carried out to verify how the presence or absence of the gelling step in the glove production process affects the properties of the resulting gloves.

In Experimental Example 32, the same conditions as those of the above-described Experimental Example 20 were adopted. Specifically, after a glove emulsion composition containing the latex A and 1% by weight of the polycarbodiimide B was applied to a ceramic plate by dipping, the ceramic plate was left to stand at room temperature (23° C.) for 1 minute as the gelling step and subsequently leached.

In contrast, in Experimental Example 33, after the same glove emulsion composition was applied to a ceramic plate by dipping, the ceramic plate was leached without performing the gelling step (the ceramic plate was left to stand at room temperature (23° C.) for 5 seconds). The 5-second standing period means that the gelling step was substantially not performed.

The operations after the leaching were basically performed by adopting the same conditions as those of the above-described Experimental Example 1 and the like.

As a result of testing the fatigue durability for each of the thus obtained gloves, the fatigue durability was found to be 2,430 minutes in Experimental Example 32 and 330 minutes in Experimental Example 33. In Experimental Example 33, sufficient fatigue durability was not obtained.

By these results, it was demonstrated that it is also important to incorporate the gelling step in the glove production process.

INDUSTRIAL APPLICABILITY

According to the embodiments of the present invention, a glove having excellent tensile characteristics and fatigue durability can be provided.

The invention claimed is:

1. A method of producing a glove, said method comprising:
   (1) a step of immersing a glove forming mold in a liquid coagulant containing calcium ions so as to allow said coagulant to adhere to said glove forming mold;
   (2) a step of adjusting the pH to be 9 or higher using an ammonium compound or an amine compound and leaving a glove emulsion composition, which has the below-described formulation, to stand with stirring;
   (3) a dipping step of immersing said glove forming mold, to which said coagulant has thus adhered in said step (1), in said glove emulsion composition;
   (4) a gelling step of leaving said glove forming mold, to which said glove emulsion composition has thus adhered, to stand at a temperature for a period that satisfy the following conditions:
   a temperature and a period that allow said calcium ions contained in said coagulant to infiltrate into an elastomer contained in said glove emulsion composition and to thereby induce gelation, without causing ammonium salts of said elastomer contained in said glove emulsion composition to be converted back to carboxyl groups and without causing a hydrophilic segment of a polycarbodiimide to be opened;
   (5) a leaching step of removing impurities from a cured film precursor thus formed on said glove forming mold;
   (6) a beading step of, after said leaching step, winding a cuff portion of a resulting glove;
   (7) a precuring step of heating and drying said cured film precursor that has been subjected to said beading step; and
   (8) a curing step of heating said cured film precursor to obtain a cured film, said heating being performed at a temperature for a period that are sufficient for said ammonium salts of said elastomer to be converted back to carboxyl groups, the carbodiimide groups of said polycarbodiimide to be exposed, and said carboxyl groups of said elastomer to react with said carbodiimide groups,
   which steps (3) to (8) are performed in the order mentioned, wherein:
   said glove emulsion composition comprises, at least: an elastomer that contains an acrylonitrile or methacrylonitrile-derived structural unit, an unsaturated carboxylic acid-derived structural unit and a butadiene-derived structural unit in a polymer main chain; a polycarbodiimide; water; and at least one pH modifier selected from an ammonium compound and an amine compound,
   said elastomer has a Mooney viscosity ($ML_{(1+4)}$ (100° C.)) of 80 or higher and not higher than 160,
   said elastomer contains said acrylonitrile or methacrylonitrile-derived structural unit in an amount of 20% by weight to 40% by weight, said unsaturated carboxylic acid-derived structural unit in an amount of 1% by weight to 10% by weight, and said butadiene-derived structural unit in an amount of 50% by weight to 75% by weight,
   said polycarbodiimide comprises at least one polycarbodiimide containing a hydrophilic segment in its molecular structure, and
   said polycarbodiimide has a polymerization degree of 2 or higher and a carbodiimide equivalent of 260 to 500.

2. The method of producing a glove according to claim 1, wherein, in said step (2), said glove emulsion composition is left to stand with stirring for 5 hours or longer.

3. The method of producing a glove according to claim 1, wherein
   said glove emulsion composition prepared in said step (2) contains a humectant, and
   said conditions of said gelling step of (4) are: at 50° C. to 70° C. for 20 seconds to less than 20 minutes.

4. The method of producing a glove according to claim 1, wherein
   said glove emulsion composition prepared in said step (2) contains no humectant, and
   said conditions of said gelling step of (4) are: at 15° C. to 25° C. for 20 seconds to 20 minutes, or at 50° C. to 70° C. for 20 seconds to less than 3 minutes.

5. The method of producing a glove according to claim 1, wherein said gelling step of (4) is performed under a condition of 40% RH to 60% RH.

6. The method of producing a glove according to claim 1, wherein the content of said polycarbodiimide in said glove emulsion composition is 0.2% by weight to 5% by weight with respect to the total amount of said glove emulsion composition.

7. A glove emulsion composition comprising, at least:
   an elastomer that contains an acrylonitrile or methacrylonitrile-derived structural unit, an unsaturated carboxylic acid-derived structural unit and a butadiene-derived structural unit in a polymer main chain;
   a polycarbodiimide;
   water; and
   at least one pH modifier selected from an ammonium compound and an amine compound,
   wherein
   said elastomer has a Mooney viscosity ($ML_{(1+4)}$ (100° C.)) of 80 or higher and not higher than 160,
   said elastomer contains said acrylonitrile or methacrylonitrile-derived structural unit in an amount of 20% by weight to 40% by weight, said unsaturated carboxylic acid-derived structural unit in an amount of 1% by weight to 10% by weight, and said butadiene-derived structural unit in an amount of 50% by weight to 75% by weight,
   said polycarbodiimide comprises at least one polycarbodiimide containing a hydrophilic segment in its molecular structure, and
   said polycarbodiimide has a polymerization degree of 2 or higher and a carbodiimide equivalent of 260 to 500.

8. The glove emulsion composition according to claim 7, further comprising a humectant.

\* \* \* \* \*